US012382933B2

(12) United States Patent
Langenfeld-McCoy et al.

(10) Patent No.: US 12,382,933 B2
(45) Date of Patent: Aug. 12, 2025

(54) METHODS OF MONITORING FEEDING BEHAVIORS OF PETS

(71) Applicant: Société des Produits Nestlé S.A., Vevey (CH)

(72) Inventors: Natalie Langenfeld-McCoy, Moro, IL (US); Ragen Trudelle-Schwarz McGowan, O'Fallon, IL (US); Mark Alan Donavon, Troy, IL (US); Mark Harris, Concord (AU); Julia Foti, Glenmore Park (AU); Kristin Slater, St Louis, MO (US); Srikanth Vemparala, Cypress, TX (US); Helber Dussan, Saint Louis, MO (US); Nicholas Schoeneck, Saint Joseph, MO (US); Olivia Arndt, Saint Joseph, MO (US); Sarah Thomas, Saint Joseph, MO (US); LeAnn Snow, Kansas City, KS (US); Stuart Neubarth, Mountain View, CA (US); Sanjay Kalsangra, Indore (IN); Sarath Malipeddi, Andra Pradesh (IN); Rabinarayan Swain, Khurdha (IN); Shivam Awasthi, Barabanki (IN); Dwarakanath Raghavendra Ravi, Gandhinagar (IN); Mohammed Affan Khan, Binny Garden (IN); Vignesh Chockalingam Arun, Tirunelveli (IN); Narendra Kumar Murugan, Pallavaram (IN); Julien Belahbib, Amiens (FR); Mani Bharath Kamaraj, Kavundampalayam (IN)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 0 days.

(21) Appl. No.: 18/811,492

(22) Filed: Aug. 21, 2024

(65) Prior Publication Data
US 2025/0072401 A1    Mar. 6, 2025

Related U.S. Application Data

(60) Provisional application No. 63/580,554, filed on Sep. 5, 2023.

(51) Int. Cl.
*G08B 23/00* (2006.01)
*A01K 29/00* (2006.01)

(52) U.S. Cl.
CPC .................................. *A01K 29/005* (2013.01)

(58) Field of Classification Search
CPC .................................................... A01K 29/005
See application file for complete search history.

(56) References Cited

U.S. PATENT DOCUMENTS 4,665,862 A * 5/1987 Pitchford, Jr. ....... A01K 5/0275
119/51.11
4,735,171 A * 4/1988 Essex .................. A01K 5/0291
119/56.2

(Continued)

FOREIGN PATENT DOCUMENTS

WO    2022096535    5/2022

OTHER PUBLICATIONS

Bailey Donald et al: "Automating monitoring of cat feeding behaviour", 2014 IEEE Sensors Applications Symposium (SAS), IEEE, Feb. 18, 2014 (Feb. 18, 2014), pp. 299-304, XP032586872, DOI: 10.1109/SAS.2014.6798965 [retrieved on Apr. 15, 2014].

(Continued)

*Primary Examiner* — Quang Pham

(57) ABSTRACT

The present disclosure relates to the monitoring feeding behavior(s) of a pet(s), under the control of at least one processor. An example method includes obtaining load data (Continued)

from a load sensor of a pet bowl while the pet is interacting with contents of the pet bowl. The load sensor can have a sensitivity of +/−50 grams or less and the load data is obtained can occur at a sample rate from 10 samples to 150 samples per second. The example method can also include sequentially grouping the load data in 0.01 second to 5 second time increments, wherein individual time increments include multiple samples, and identifying a feeding behavior occurring within one or more of the time increments based on the load data resulting from the pet interacting with the pet bowl or the contents of the pet bowl.

22 Claims, 12 Drawing Sheets

(56) References Cited

U.S. PATENT DOCUMENTS

| | | | | |
|---|---|---|---|---|
| 4,896,970 | A * | 1/1990 | Schuler | B01F 27/054 241/101.8 |
| 5,363,805 | A * | 11/1994 | Wing | A01K 5/0291 119/51.11 |
| 5,404,838 | A * | 4/1995 | Khan | A01K 5/0114 119/51.5 |
| 5,570,655 | A * | 11/1996 | Targa | A01K 15/023 119/908 |
| 5,975,016 | A * | 11/1999 | Wesenhagen | A01K 5/0135 119/61.55 |
| 6,375,612 | B1 * | 4/2002 | Guichon | G16H 40/67 119/51.02 |
| 6,401,657 | B1 * | 6/2002 | Krishnamurthy | A01K 5/0291 119/51.11 |
| 7,380,518 | B2 * | 6/2008 | Kates | G01S 13/86 119/51.01 |
| 7,513,216 | B2 * | 4/2009 | Neckel | A01K 5/0114 119/51.01 |
| 7,579,957 | B2 * | 8/2009 | Igami | B65D 85/68 324/202 |
| 7,827,935 | B1 * | 11/2010 | Addleman | A01K 5/0142 119/59 |
| 7,874,265 | B1 * | 1/2011 | Addleman | A01K 5/025 119/59 |
| 8,100,084 | B1 * | 1/2012 | Abramson | A01K 5/0283 119/57.2 |
| 8,627,786 | B2 * | 1/2014 | Arthur | A01K 5/0114 119/61.5 |
| 8,651,057 | B1 * | 2/2014 | Welsh | A01K 61/90 119/215 |
| 8,701,595 | B2 * | 4/2014 | Jin | A01K 5/0291 119/51.01 |
| 8,930,148 | B2 * | 1/2015 | Huisma | A01K 29/005 119/51.02 |
| 8,997,692 | B2 * | 4/2015 | Lipscomb | A01K 5/0114 119/61.55 |
| 9,685,097 | B2 * | 6/2017 | Hoover | G09B 19/0092 |
| 10,045,511 | B1 * | 8/2018 | Yarden | A61B 5/7405 |
| 10,080,343 | B1 * | 9/2018 | Chu | A01K 5/0114 |
| 10,085,419 | B2 * | 10/2018 | Zimmerman | A01K 5/0107 |
| 10,091,972 | B1 * | 10/2018 | Jensen | A01K 7/02 |
| 10,231,440 | B2 * | 3/2019 | Seltzer | A01K 29/005 |
| 10,571,994 | B1 * | 2/2020 | Tham | G06F 1/3215 |
| 10,631,520 | B2 * | 4/2020 | Sayers | A01K 5/0114 |
| 10,645,908 | B2 * | 5/2020 | Seltzer | A01K 27/001 |
| 10,674,702 | B2 * | 6/2020 | Gibbs | A01K 7/00 |
| 10,694,718 | B2 * | 6/2020 | Brehmer | A01K 5/0233 |
| 11,033,002 | B1 * | 6/2021 | Mundell | G06V 40/10 |
| 11,083,169 | B2 * | 8/2021 | Mundell | A01K 29/005 |
| 11,138,901 | B1 * | 10/2021 | Angel | G06V 20/00 |
| 11,172,649 | B2 * | 11/2021 | Brayer | A01K 27/005 |
| 11,216,643 | B1 * | 1/2022 | Madden | G08B 25/10 |
| 11,330,796 | B2 * | 5/2022 | Veness | A01K 5/0225 |
| 11,925,175 | B2 * | 3/2024 | Yoo | G01G 23/00 |
| 11,932,156 | B2 * | 3/2024 | Salter | A01K 7/02 |
| 11,950,571 | B2 * | 4/2024 | Wernimont | H04Q 9/00 |
| 11,950,582 | B2 * | 4/2024 | Salter | H04B 1/02 |
| 12,082,552 | B1 * | 9/2024 | Wei | A01K 1/0047 |
| 12,102,064 | B1 * | 10/2024 | Yang | A01K 5/0114 |
| 2002/0134313 | A1 * | 9/2002 | Andrew King | A01K 5/025 119/51.02 |
| 2003/0100998 | A2 * | 5/2003 | Brunner | G16H 10/60 382/128 |
| 2003/0205208 | A1 * | 11/2003 | Bar-Shalom | A01K 29/005 119/859 |
| 2005/0217591 | A1 * | 10/2005 | Turner | A01K 5/0114 119/51.02 |
| 2006/0185606 | A1 * | 8/2006 | Park | A01K 5/0114 119/51.12 |
| 2007/0181068 | A1 * | 8/2007 | McKeown | A01K 5/02 119/51.02 |
| 2008/0110405 | A1 * | 5/2008 | Voronin | A61D 17/002 119/174 |
| 2008/0252464 | A1 * | 10/2008 | Panasevich | G07C 9/28 340/573.1 |
| 2008/0314325 | A1 * | 12/2008 | Hempstead | A01K 1/0023 119/51.02 |
| 2009/0126640 | A1 * | 5/2009 | Ulman | A01K 5/0275 340/573.3 |
| 2009/0187349 | A1 * | 7/2009 | Mainini | A01K 5/0114 702/19 |
| 2009/0250012 | A1 * | 10/2009 | Greene | A01K 11/008 119/51.02 |
| 2009/0288606 | A1 * | 11/2009 | Zimmerman | A01K 5/0225 119/51.01 |
| 2010/0066532 | A1 * | 3/2010 | Bremner | A01K 15/023 340/539.16 |
| 2010/0263596 | A1 * | 10/2010 | Schumann | A01K 5/0114 119/51.02 |
| 2010/0299074 | A1 * | 11/2010 | Chang | A01K 29/00 702/19 |
| 2011/0126770 | A1 * | 6/2011 | Mulder | A01K 29/00 119/51.01 |
| 2011/0126772 | A1 * | 6/2011 | Arnerup | A01K 9/00 119/72 |
| 2011/0139076 | A1 * | 6/2011 | Pu | A01K 5/0291 119/51.02 |
| 2011/0168099 | A1 * | 7/2011 | Van Lier | A01K 5/02 119/51.02 |
| 2011/0180007 | A1 * | 7/2011 | Mainini | A01K 7/02 340/618 |
| 2011/0192213 | A1 * | 8/2011 | Zimmerman | A01K 5/02 73/23.3 |
| 2011/0283952 | A1 * | 11/2011 | Bruer | A01K 1/0158 119/448 |
| 2011/0297090 | A1 * | 12/2011 | Chamberlain | A01K 5/0291 119/51.02 |
| 2011/0297091 | A1 * | 12/2011 | Chamberlain | A01K 5/0142 119/702 |
| 2012/0089340 | A1 * | 4/2012 | Huisma | A01K 29/005 702/19 |
| 2012/0105210 | A1 * | 5/2012 | Smith | G06K 19/0723 340/10.1 |
| 2012/0199076 | A1 * | 8/2012 | Biede | A01K 5/0114 119/51.02 |
| 2012/0227668 | A1 * | 9/2012 | Aycock | A01K 5/0142 119/51.02 |
| 2012/0294876 | A1 * | 11/2012 | Zimmerman | A61B 5/082 128/203.14 |
| 2012/0299731 | A1 * | 11/2012 | Triener | G16Z 99/00 702/19 |
| 2013/0138389 | A1 * | 5/2013 | Gyongy | G01P 15/00 702/141 |
| 2013/0305994 | A1 * | 11/2013 | Dubinsky | A01K 5/0291 119/51.11 |
| 2013/0333622 | A1 * | 12/2013 | Jin | A01K 5/0291 119/51.01 |
| 2014/0083364 | A1 * | 3/2014 | Anderson | A01K 15/02 119/51.01 |

(56) References Cited

U.S. PATENT DOCUMENTS

| | | | |
|---|---|---|---|
| 2014/0130747 A1* | 5/2014 | Lipscomb | A01K 5/0114 119/54 |
| 2014/0149546 A1* | 5/2014 | Hong | H04L 67/125 709/217 |
| 2014/0257753 A1* | 9/2014 | Wang | A01K 5/02 702/188 |
| 2015/0040832 A1* | 2/2015 | Klein | A01K 5/025 119/51.11 |
| 2015/0143750 A1* | 5/2015 | Jalbert | A01K 5/025 49/25 |
| 2015/0164044 A1* | 6/2015 | Powers | A01K 5/0225 119/61.5 |
| 2015/0181840 A1* | 7/2015 | Tupin, Jr. | A61B 5/0008 600/483 |
| 2015/0342143 A1* | 12/2015 | Stewart | A01K 5/0283 119/51.02 |
| 2015/0373945 A1* | 12/2015 | Sung | A01K 11/006 119/51.02 |
| 2016/0000036 A1* | 1/2016 | Cornwell, Jr. | A01K 5/0291 119/51.11 |
| 2016/0012748 A1* | 1/2016 | Donavon | G09B 19/0092 434/225 |
| 2016/0021506 A1* | 1/2016 | Bonge, Jr. | G16H 40/67 717/173 |
| 2016/0029592 A1* | 2/2016 | Springer | G08C 17/02 119/51.11 |
| 2016/0050888 A1* | 2/2016 | Berckmans | A01K 39/02 119/51.01 |
| 2016/0135433 A1* | 5/2016 | Harty | A61B 5/1118 600/595 |
| 2016/0165851 A1* | 6/2016 | Harty | A61D 17/002 600/595 |
| 2016/0192619 A1* | 7/2016 | Gibbs | A01K 29/005 119/61.5 |
| 2016/0374316 A1* | 12/2016 | Mainini | A01K 15/026 119/51.02 |
| 2017/0049545 A1* | 2/2017 | Carton | G16Z 99/00 |
| 2017/0318779 A1* | 11/2017 | Jerina | A01K 1/105 |
| 2017/0347632 A1* | 12/2017 | Auer | A01K 11/006 |
| 2017/0360001 A1* | 12/2017 | Barney | A01K 5/0225 |
| 2017/0362092 A1* | 12/2017 | Mainini | C02F 1/66 |
| 2018/0092597 A1* | 4/2018 | Schaevitz | A61B 5/4848 |
| 2018/0125032 A1* | 5/2018 | Richards | C02F 1/686 |
| 2018/0235183 A1* | 8/2018 | Gibbs | A01K 5/02 |
| 2018/0242889 A1* | 8/2018 | Izumo | A61B 5/1126 |
| 2019/0018378 A1* | 1/2019 | Varikooty | G05B 19/042 |
| 2019/0029221 A1* | 1/2019 | Anderton | A01K 5/0225 |
| 2019/0029222 A1* | 1/2019 | Anderton | A01K 5/0233 |
| 2019/0126036 A1* | 5/2019 | Franco-Obregon | A61N 1/326 |
| 2019/0274282 A1* | 9/2019 | Black | G08C 17/02 |
| 2019/0298226 A1* | 10/2019 | Filipowicz | A61B 5/6807 |
| 2019/0336041 A1* | 11/2019 | Geissler | A61B 5/0064 |
| 2019/0357497 A1* | 11/2019 | Honchariw | A01K 15/021 |
| 2019/0380303 A1* | 12/2019 | Davis | A01K 5/025 |
| 2020/0068853 A1* | 3/2020 | Radovcic | H04M 1/72403 |
| 2020/0087135 A1* | 3/2020 | Youn | B01D 29/15 |
| 2020/0093092 A1* | 3/2020 | Soug | B25J 5/007 |
| 2020/0113158 A1* | 4/2020 | Rishi | G06F 18/217 |
| 2020/0128786 A1* | 4/2020 | Ji | H04B 1/02 |
| 2020/0187452 A1* | 6/2020 | Daniel | A01K 5/0225 |
| 2020/0305387 A1* | 10/2020 | Gibbs | A01K 29/005 119/61.5 |
| 2020/0305388 A1* | 10/2020 | Halachmi | G16H 20/60 |
| 2020/0315138 A1* | 10/2020 | Mundell | A01K 15/021 |
| 2021/0000069 A1* | 1/2021 | Veness | A01K 5/0258 |
| 2021/0007330 A1* | 1/2021 | Huisma | G06Q 10/087 |
| 2021/0076644 A1* | 3/2021 | Harvey | A01K 11/004 |
| 2021/0161101 A1* | 6/2021 | Wyatt | A63B 22/02 |
| 2021/0176970 A1* | 6/2021 | Engstrom | G05B 13/0265 |
| 2021/0289746 A1* | 9/2021 | Villalobos | A01K 5/02 |
| 2022/0039358 A1* | 2/2022 | Wernimont | G16H 50/20 |
| 2022/0061306 A1* | 3/2022 | Luttrell | A01M 25/004 |
| 2022/0061765 A1* | 3/2022 | Nichol | A61B 5/01 |
| 2022/0200519 A1* | 6/2022 | Biffert | A01K 11/006 |
| 2022/0217950 A1* | 7/2022 | Song | A61B 5/1079 |
| 2022/0283136 A1* | 9/2022 | Hagen | A01J 5/01 |
| 2022/0295750 A1* | 9/2022 | Song | A01K 29/005 |
| 2022/0312698 A1* | 10/2022 | Burkey | G06Q 10/063 |
| 2022/0322640 A1* | 10/2022 | Ryan | A01K 27/001 |
| 2023/0000058 A1* | 1/2023 | Baker | A01K 5/02 |
| 2023/0032312 A1* | 2/2023 | Smith | A01K 5/0275 |
| 2023/0086838 A1* | 3/2023 | Keating | G05B 15/02 119/721 |
| 2023/0103420 A1* | 4/2023 | Worth | G06Q 50/02 119/14.08 |
| 2023/0143669 A1* | 5/2023 | O'Dwyer | A01K 15/02 340/573.3 |
| 2023/0270077 A1* | 8/2023 | Lammers | A01K 19/00 119/840 |
| 2023/0309509 A1* | 10/2023 | Gopinath | A01K 27/009 119/51.02 |
| 2023/0337637 A1* | 10/2023 | Mundell | A01K 15/02 |
| 2024/0040998 A1* | 2/2024 | Geissler | A01K 29/005 |
| 2024/0172739 A1* | 5/2024 | Nomura | A01M 29/16 |
| 2024/0188535 A1* | 6/2024 | Doughty | A01K 5/0291 |
| 2024/0268341 A1* | 8/2024 | Sides | A01K 5/0114 |
| 2024/0284876 A1* | 8/2024 | Klaas | A01K 5/02 |
| 2024/0337055 A1* | 10/2024 | Ito | D05B 19/12 |
| 2024/0407332 A1* | 12/2024 | Biffert | A01K 29/005 |

OTHER PUBLICATIONS

International Search Report and Written Opinion to PCT/IB2024/058153 dated Dec. 19, 2024.

* cited by examiner

METHODS OF MONITORING FEEDING BEHAVIORS OF PETS

CROSS REFERENCE TO RELATED APPLICATIONS

This application claims the benefit of and priority to U.S. Provisional Application Ser. No. 63/580,554 filed Sep. 5, 2023, the disclosure of which is incorporated in its entirety herein by this reference.

BACKGROUND

Pet bowls are used by a variety of pet owners or animal custodians to provide food or water (or other liquid) to their animals. Eating or drinking behavior can provide some clues as to healthy feeding habits, but in some instances, eating or drinking behavior may be a tool suitable for detecting animal health issues that may arise. For example, some visual indicators related to animal eating or drinking behavior can be used to provide information about animal health including the onset of physical, behavioral, or mental health issues. Unfortunately, these visually noticeable symptoms may become visually noticeable at mid- to late-stages of a disease or health issue and often do not provide enough information for correct intervention. Moreover, custodians of animals, such as pet owners, often lack the animal behavioral knowledge to associate eating or drinking behaviors with health issues.

There have been some efforts to track animal eating and drinking behaviors, including the use of cameras, scales, and the like. While these devices may be helpful in tracking some basic information, e.g., amount of food or water consumed, time of food or water consumed, etc., these devices typically provide inadequate information to assess small changes in eating and/or drinking behavior that may give clues to animal health.

DETAILED DESCRIPTION

Figure 1:
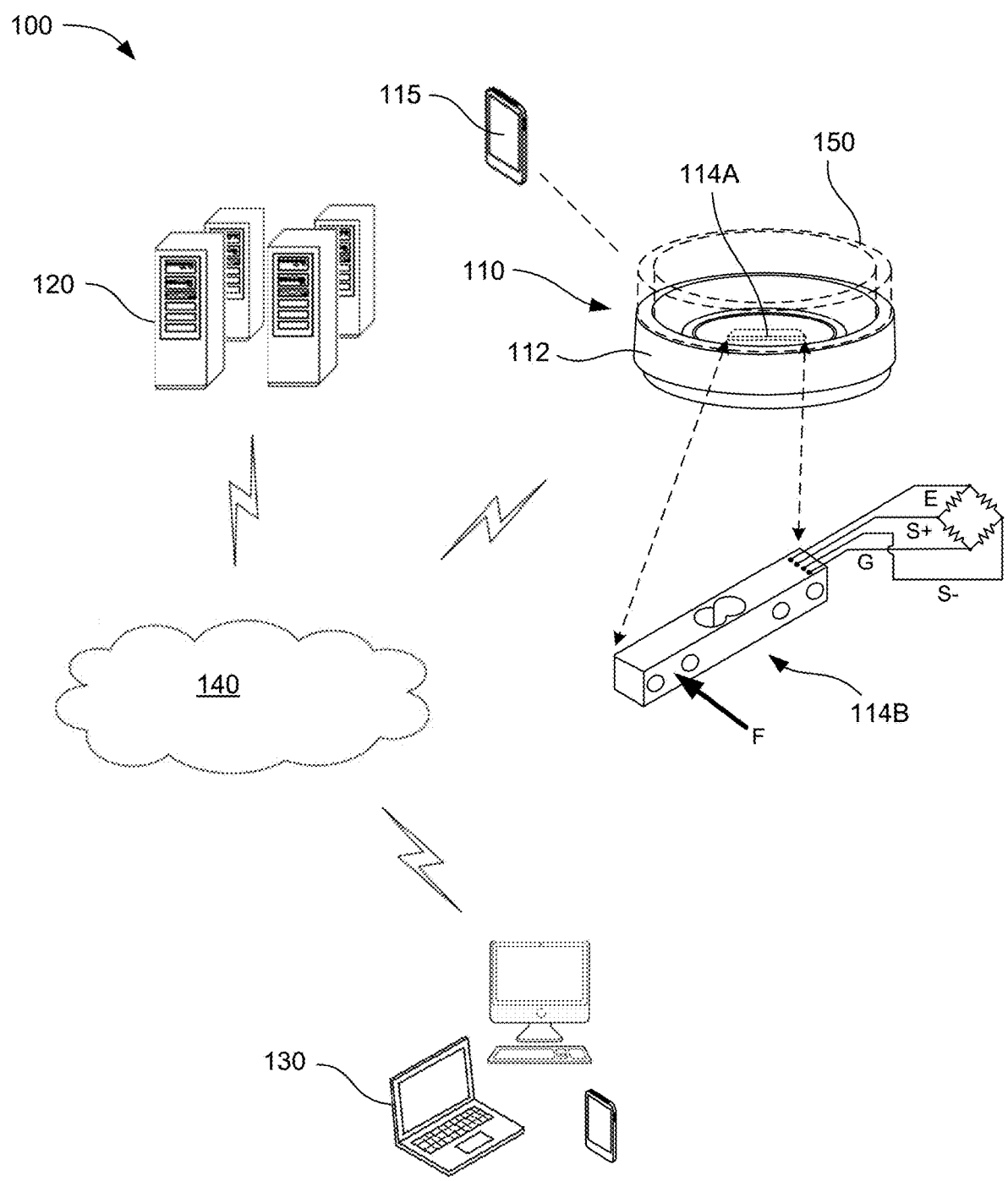
FIG. 1 schematically illustrates example systems of monitoring pet feeding behaviors including a smart pet bowl in accordance with the present disclosure.

The present disclosure relates to animal health and behavior monitoring, and more particularly, devices, systems, methods, and computer program products for determining, monitoring, processing, recording, and transferring over a network of various physiological and behavioral parameters of animals.

In accordance with examples of the present disclosure, a method of monitoring feeding behavior of a pet, under the control of at least one processor, can include obtaining load data from a load sensor of a pet bowl while the pet is interacting with contents of the pet bowl, sequentially grouping the load data in 0.01 second to 5 second time increments, wherein individual time increments include multiple samples, and identifying a feeding behavior occurring within one or more of the time increments based on the load data resulting from the pet interacting with the pet bowl or the contents of the pet bowl. The load sensor in this example can have a sensitivity of +/−50 grams or less and the load data is obtained at a sample rate from 10 samples to 150 samples per second.

In another example, a non-transitory machine readable storage medium having instructions embodied thereon. When the instructions are executed, the instructions cause a processor to perform a method of monitoring feeding behavior of a pet. The method of monitoring the feeding behavior can include obtaining load data from a load sensor of a pet bowl while the pet is interacting with contents of the pet bowl, sequentially grouping the load data in 0.01 second to 5 second time increments, wherein individual time increments include multiple samples, and identifying a feeding behavior occurring within one or more of the time increments based on the load data resulting from the pet interacting with the pet bowl or the contents of the pet bowl. The load sensor in this example can have a sensitivity of +/−50 grams or less and the load data is obtained at a sample rate from 10 samples to 150 samples per second.

With respect to these and other related methods monitoring feeding behavior of a pet as well as the method steps related to the instructions from the non-transitory machine readable storage media, an additional step may include excluding load data in identifying the feeding behavior if determined to be a result of human interaction, a false trigger, or an accidental interaction with the pet bowl or the contents of the pet bowl. In further detail, in some examples, the feeding behavior may be a count-based feeding behavior selected from lapping, licking, or biting. In other examples, the feeding behavior may be a duration-based behavior selected from the pet touching the bowl, moving the bowl, nosing the food, pausing, eating, lapping, licking, or biting. With respect to count-based feeding behaviors, these "counts" can be based on individual micro-events of the feeding behavior within a single time increment or a time period spanning multiple time increments. The individual micro-events may include, for example, individual laps, individual licks, or individual bites. In some examples, the count-based feeding behavior may be used to characterize periods of time spanning one or multiple time increments where the count-based behavior is not occurring. With respect to duration-based feeding behaviors, in some examples, these can be characterized by sequentially mapping the time increments in which the duration-based behavior occurs or is not occurring. In further detail, the methods can include notifying a custodian of the pet, e.g., pet owner or foster, of the feeding behavior or a change in the pet feeding behavior. This notification can include warning the custodian that the changes in the pet feeding behavior may be correlated to a potential health or behavior issue. These methods can likewise include the obtaining of secondary data from a secondary sensor associated with the pet bowl. Example secondary sensors can include a proximity sensor, a camera, a microphone, an accelerometer, a gyroscope, an inertial measurement unit sensor, a radar, or a combination thereof. In some more specific examples, parameters for use with a dog water bowl may be as follows: +/−4 grams or less sensitivity, 15-75 samples per second (sample rate), and at least 0.4 second time increments; and parameters for use with a dog food bowl may be as follows: +/−4 grams or less sensitivity, 15-75 samples per second (sample rate), and at least 0.3 second time increments. Parameters for use with a cat water bowl may be as follows: +/−2 grams or less sensitivity, 15-75 samples per second (sample rate), and at least 0.4 second time increments; and parameters for use with a dog food bowl may be as follows: +/−2 grams or less sensitivity, 15-75 samples per second (sample rate), and at least 0.3 second time increments. In other examples, the methods can include generating a feeding behavior model for the pet. The feeding behavior model may include identifying the feeding behavior of the pet based on frequency of feeding, pet feeding signature behaviors, or a combination thereof.

In accordance with examples related to the methods of monitoring feeding behavior of a pet and the non-transitory machine readable storage medium, as well as the related smart pet bowls and/or systems for monitoring feeding behaviors of a pet disclosed herein, various details related to the methods, the storage media and instructions, smart pet bowls and/or the systems can be overlapping to some degree. For example, the processor(s) and/or the memory(s) may be onboard or located remotely relative to the smart pet bowl, which may relate to the various options for use with the systems and/or methods. For example, the sample rate, the sequential time increments, or both, may be controlled onboard by the smart pet bowl and/or by a client device over a computer network. In some examples, the smart pet bowl can be capable of excluding load data of a human, a false trigger, or an accidental interaction with the smart pet bowl or contents thereof. In additional detail, the sensitivity, sample rate, and the sequential time increments can be established at levels sufficient to identify count-based feeding behavior, e.g., lapping, licking, or biting. In other examples, the sensitivity, sample rate, and sequential time increments can be established at levels sufficient to allow for counting individual micro-events of the feeding behavior within a single time increment or for an unbroken period of time spanning multiple time increments. Individual micro-events may include, for example, individual laps, individual licks, or individual bites. In further detail, the sensitivity, sample rate, and sequential time increments can be established at levels sufficient to identify a duration-based feeding behavior. Example duration-based feeding behaviors may include the pet touching the bowl, moving the bowl, nosing the food, pausing, eating, lapping, licking, or a combination thereof. The sensitivity, sample rate, and sequential time increments can likewise be established at levels sufficient to allow for sequential mapping of the time increments in which the duration-based feeding behavior occurs or is not occurring. In some examples, a secondary sensor may be included, such as a proximity sensor, a camera, a microphone, an accelerometer, a gyroscope, an inertial measurement unit sensor, or a combination thereof. Dogs and cats are examples of pets that can utilize this technology.

Regarding the sensitivity of the load sensors, one example prototype has been found to work efficiently at a signal to noise ratio of 4 grams, and thus, any signal that is generated at greater than 4 grams in this particular example provides an effective tool for identifying pet feeding behaviors. In other systems, a signal to noise ratio as low 0.1 gram or less, 0.25 gram or less, or 0.5 gram or less provide a system that is even more sensitive for identifying pet feeding behavior, particularly those behaviors that do not generate as much force onto the pet food bowls of the present disclosure. In further detail regarding sample rate, though a range of 10 sample to 150 samples per second have been found to be effective in identifying pet feeding behaviors, a middle-range of from about 15 samples to about 75 samples per second provides sufficient and accurate information to properly characterize the various feeding behaviors.

In some examples, the smart pet bowl may be a dog water bowl with a load sensor having a sensitivity of +/−4 grams or less. With the dog water bowl, the sample rate can be from 15 to 75 samples per second, and the time increments are at least about 0.4 second, or at least about 0.5 second. In some examples, the dog water bowl may have a sensitivity of +/−0.25 grams or less with a sample rate from 20 to 75 or from 35 to 65 samples per second. In other examples, the smart pet bowl may be a dog food bowl with a load sensor having a sensitivity of +/−4 grams or less. With the dog food bowl, the sample rate can be from 15 to 75 samples per second, and the time increments are at least about 0.3 second, or at least about 0.333 second (or ⅓ second). In some examples, the dog water bowl may have a sensitivity of +/−0.25 grams or less with a sample rate from 20 to 75 or from 35 to 65 samples per second.

In other examples, the smart pet bowl may be a cat water bowl with a load sensor having a sensitivity of +/−2 grams or less. With the cat water bowl, the sample rate can be from 15 to 75 samples per second, and the time increments are at least about 0.4 second, or at least about 0.5 second. In some examples, the cat water bowl may have a sensitivity of +/−0.25 grams or less with a sample rate from 20 to 75 or from 35 to 65 samples per second. In other examples, the smart pet bowl may be a cat food bowl with a load sensor having a sensitivity of +/−2 grams or less. With the cat food bowl, the sample rate can be from 15 to 75 samples per second, and the time increments are at least about 0.3 second, or at least about 0.333 second (or ⅓ second). In some examples, the cat water bowl may have a sensitivity of +/−0.25 grams or less with a sample rate from 20 to 75 or from 35 to 65 samples per second.

In additional detail, the methods of monitoring feeding behavior of a pet and/or the non-transitory machine readable storage medium for monitoring feeding behavior of a pet can be carried out in a multi-pet household. For example, the methods and/or non-transitory machine readable storage medium may include identifying the pet for monitoring when the pet is from a multi-pet household. As mentioned, the smart pet bowl may be equipped with one or more secondary sensors, e.g., a proximity sensor, a camera, a microphone, an accelerometer, a gyroscope, an inertial measurement unit sensor, and/or a radar, etc. In other examples, the pet can be identified using the load data during eating and/or drinking, as multiple animals may have different eating behavior profiles that may be able to be differentiated in some examples. Thus, the smart pet bowls of the present disclosure bowls can provide personalized insights for individual animals, e.g., individual pets in a multi-pet household.

Additional features and advantages of the disclosed smart pet bowl(s) and systems to monitor feeding behavior, e.g., eating and/or drinking behavior, of a pet are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

In accordance with examples herein, a smart pet bowl 110 as well as a system 100 for monitoring animal feeding behavior, e.g., eating and/or drinking, of animals is shown in FIG. 1 by way of example. In some examples, monitoring of animal feeding behavior can be used for animal health monitoring.

The smart pet bowl 110 in particular can be a single unit with a bowl support 112 and one or more load sensors 114A positioned to obtain load data regarding the interactions of animals and/or people with the smart pet bowl (or contents thereof). In the example shown, the bowl support is in the shape of a bowl, and thus, pet food and/or water could be added directly to the bowl-shaped bowl support. However, it is understood that the bowl support could have this shape or even a different shape suitable for receiving a bowl insert 150 that is shaped to receive pet food and/or water. In this instance, the bowl support is bowl-shaped. A separate bowl insert is shown in phantom lines to indicate that such a bowl insert may be included to interact with the load sensor(s) of the bowl support. This can allow for inserting more specialized bowls into a common bowl support, such as those shown at FIG. 2 hereinafter. Either way, the load sensor(s) can be located in a position that does not disrupt the natural behavior(s) of the animal. The load sensors can automatically detect various feeding behaviors of the animal while eating.

In further detail, an enlarged example load sensor 114B is shown with sample circuitry that may be used to collect the load data as the animal and/or human interacts with the smart pet bowl. Other load sensors and/or circuitry may be used and/or multiple load sensors may be used. Regardless of which load sensor(s), number of load sensors, placement of load sensors, etc., are used, the load sensors and associated circuitry or logic can be configured to be sensitive enough (sensitivity) and fast enough (sample rate) to provide load data over relatively short time increments (0.1 sec to 5 secs) that are suitable for differentiating count-based feeding behaviors and/or duration-based feeding behavior, and even individual micro-behaviors in some examples. The smart pet bowl may also be capable of excluding load data of a human, false trigger, or accidental interaction with the smart pet bowl or contents thereof.

Count-based feeding behaviors may include, for example, lapping, licking, and/or biting. These count-based feeding behaviors can be counted using individual micro-events related to the feeding behavior within a single time increment or for an unbroken period of time spanning multiple time increments. Thus, in accordance with this, individual micro-events may include individual laps, individual licks, or individual bites. Duration-based feeding behaviors may include, for example, touching the bowl, moving the bowl, nosing the food, pausing, eating, lapping, and/or licking, etc. These duration-based feeding behaviors can be established at levels sufficient to allow for sequential mapping of the time increments in which the duration-based feeding behavior occurs or is not occurring. The load sensitivity may be fixed based on the architecture of the load sensor(s) 114B, or it may be modifiable via the circuitry chosen, for example. In further detail, the sample rate, the sequential time increments, or both may be controlled onboard by the smart pet bowl. In other examples, the sample rate, the sequential time increments, or both may be controlled by a client device over the computer network.

With respect to the systems 100 of monitoring the feeding behavior of a pet(s), the smart pet bowl 110 can be used in the context of other connected computers and/or server systems by wireless or wired connection. For example, the system of monitoring pet feeding behavior can include client devices 130 and analysis server systems 120 in addition to the smart pet bowl, each of which are in communication via network 140. In this example, the smart pet bowl, which may include a bowl support 112 and a bowl insert 150 in some examples, can be loaded with pet food or water (or other liquid). In some aspects, the analysis server systems may be implemented using a single server. In other aspects, the analysis server systems can be implemented using a plurality of servers. In still other examples, client devices can be interactive with and implemented utilizing the analysis server systems and vice versa.

Client devices 130 can include, for example, desktop computers, laptop computers, smartphones, tablets, and/or any other user interface suitable for communicating with the smart pet bowl. Client devices can obtain a variety of data from one or more smart pet bowls 110, provide data and insights regarding one or more animals via one or more software applications, and/or provide data and/or insights to the analysis server systems 120 as described herein. The software applications can provide data regarding animal weight and behavior, track changes in the data over time, and/or provide health information regarding the animals as described herein. In some embodiments, the software applications obtain data from the analysis server systems for processing and/or display.

Analysis server systems 120 can obtain data from a variety of client devices 130 and/or smart pet bowl 110 as described herein. The analysis server systems can provide data and insights regarding one or more animals and or transmit data and/or insights to the client devices. These insights can include, but are not limited to, insights regarding animal weight and behavior, changes in the data over time, and/or health information regarding the animals as described herein. In a number of embodiments, the analysis server systems obtain data from multiple client devices and/or smart pet bowl, identify cohorts of animals within the obtained data based on one or more characteristics of the animals, and determine insights for the cohorts of animals. The insights for a cohort of animals can be used to provide recommendations for a particular animal that has characteristics in common with the characteristics of the cohort. In some examples, the analysis server systems provide a portal (e.g., a web site) for vets to access information regarding particular animals.

The smart pet bowl can transmit data to the client devices 130 and/or analysis server systems 120 for processing and/or analysis. In some examples, the smart pet bowl can communicate directly with a non-network client device 115 without sending data through the network 140. The term "non-network" client device does not infer it is not also connected via the cloud or other network, but merely that there is a wireless or wired connection that can be present directly with the smart pet bowl. For example, the smart pet bowl and the non-network client device can communicate via Bluetooth. In some examples, the smart pet bowl may process the load sensor data directly. In other examples, the smart pet bowl may utilize the load sensor data to determine if the smart pet bowl is balanced (particularly with multiple load sensors), unbalanced, and/or properly calibrated. In some instances, automatic or manual adjustment of one or more adjustable load sensors positioned to interact with the contents of the smart pet bowl can be carried out. In other instances, such balancing and/or calibration may be fixed as the load sensor typically is positioned at a location that is not directly in contact with the floor and does not bear the weight of the bowl support and/or the bowl insert if included.

Any of the computing devices shown in FIG. 1 (e.g., client devices 130, analysis server systems 120, smart pet bowl 110, non-networked client device 115, etc.) can include a single computing device, multiple computing devices, a cluster of computing devices, or the like. A computing device can include one or more physical processors communicatively coupled to memory devices, input/output devices, or the like. As used herein, a processor may also be referred to as a central processing unit (CPU). The client devices can be accessed by the animal owner, a veterinarian, or any other user.

Additionally, as used herein, a processor can include one or more devices capable of executing instructions encoding arithmetic, logical, and/or I/O operations. In one illustrative example, a processor may implement a Von Neumann architectural model and may include an arithmetic logic unit (ALU), a control unit, and/or a plurality of registers. In some aspects, a processor may be a single core processor that is typically capable of executing one instruction at a time (or process a single pipeline of instructions) and/or a multi-core processor that may simultaneously execute multiple instructions. In some examples, a processor may be implemented as a single integrated circuit, two or more integrated circuits, and/or may be a component of a multi-chip module in which individual microprocessor dies are included in a single integrated circuit package and hence share a single socket. As described herein, a memory refers to a volatile or non-volatile memory device, such as RAM, ROM, EEPROM, or any other device capable of storing data. Input/output devices can include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. In some aspects, a computing device provides an interface, such as an API or web service, which provides some or all of the data to other computing devices for further processing. Access to the interface can be open and/or secured using any of a variety of techniques, such as by using client authorization keys, as appropriate to the requirements of specific applications of the disclosure.

The network 140 can include a LAN (local area network), a WAN (wide area network), telephone network (e.g., Public Switched Telephone Network (PSTN)), Session Initiation Protocol (SIP) network, wireless network, point-to-point network, star network, token ring network, hub network, wireless networks (including protocols such as EDGE, 3G, 4G LTE, Wi-Fi, 5G, WiMAX, and the like), the Internet, or the like. A variety of authorization and authentication techniques, such as username/password, Open Authorization (OAuth), Kerberos, SecureID, digital certificates, and more, may be used to secure the communications. It will be appreciated that the network connections shown in the example pet feeding behavior monitoring system 100 are illustrative, and any means of establishing one or more communication links between the computing devices may be used.

The systems of monitoring feeding behavior can, for example, automatically track feeding frequency, feeding type (food and/or water), feeding behavior based on count-based feeding interactions and/or duration-based feeding interactions, changes in feeding behavior, etc. For example, by collecting historical information related to the load data collected, monitoring these or other parameters can be used directly (or optionally combined with a variety of other sensor data and/or other biographical data of the animal (e.g., age/life stage, sex, reproductive status, body condition, weight data, or the like) to identify when changes occur that could be associated with potential health or behavioral conditions affecting the animal.

The smart pet bowl and the systems of monitoring pet feeding behavior can advantageously provide early indicators of potential health conditions including, but not limited to, physical, behavioral and mental health of an animal. Examples of physical health include but are not limited to renal health, urinary health, metabolic health, digestive health, etc. More specifically, animal diseases that may be correlated with behavioral feeding data obtained from use of the smart pet bowl and related systems include but are not limited to diabetes, chronic kidney disease, hyperthyroidism, etc. Based on these potential health conditions, proactive notifications can be provided to the animal's owner and/or veterinarian for further diagnosis and treatment.

In further detail regarding notifications, information regarding the animal can be transmitted, which may include notification related to indicating the animal's behavior can be generated based on the categorized event and/or historical event for the animal. In some embodiments, the notification can be generated based on events for other animals in the same cohort as the animal. The notification can indicate that an event has occurred and/or can indicate one or more inferences regarding the animal. For example, the animal's water consumption behavior can be tracked over time and, if there is an increase in this activity over time or number of events, a notification can be generated to alert pet parent of this change in behavior and encouraging the caregiver to take the pet to the vet, as this behavior could be associated with diabetes or advanced renal failure or other renal disease. In some embodiments, a notification is transmitted once a threshold amount of data and/or events has been determined. The notification can be transmitted to a client device associated with the animal's owner and/or the animal's veterinarian as described herein. In a number of embodiments, the notification provides an indication requesting the user confirm that the detected event is correct. In this way, the notification can be used to obtain ground truth labels for events that can be used to train and/or retrain one or more machine classifiers. Notifications can likewise be generated and/or transmitted based on a particular animal performing an event.

Regarding operation of the smart pet bowls described herein, a variety of user interfaces can be provided to ensure the proper installation, configuration, and usage of systems of monitoring feeding behaviors. These user interfaces can provide instruction to users, solicit information from users, and/or provide insights into the behaviors and potential concerns with one or more animals. When setting up systems of monitoring feeding behavior, the initialization and location of the smart pet bowl may be valuable in ensuring the accuracy of the collected load data. In some embodiments, the smart pet bowl may function better in an indoor, climate-controlled environment without direct sunlight. In other examples, the smart pet bowl should be placed at least one inch away from all walls or other obstacles as failure to provide adequate space may cause the smart pet bowl to become stuck on obstacles, interfering with data or readings. Additionally, the smart pet bowl may be located an adequate distance from high vibration items (such as washers and dryers) or high traffic areas as the vibrations can cause false readings and/or inaccurate readings in weight sensors. In some embodiments, the smart pet bowl function may be better on a smooth, level, hard surface, as soft or uneven surfaces can affect the accuracy of load sensors, though they may still function in such conditions to provide usable data. In many embodiments, the smart pet bowl can be slowly introduced to an animal to improve the incorporation of the smart pet bowl into the environment. For example, the smart pet bowl can be placed in the same room as the litterbox for a few days to allow the animal to acclimate to the presence of the smart pet bowl. Once the animal is comfortable with the presence of the smart pet bowl, the smart pet bowl can be turned down to allow the animal to become acclimated to the subtle sounds and lights that may be present in the operation of the smart pet bowl, e.g., dispenser sound, LED lights, etc.

In some embodiments, multiple user interfaces for configuring systems of monitoring feeding behavior may be used. The user interfaces may include, a user interface for initiating a smart pet bowl setup process, a user interface for initiating a network setup process, a user interface for connecting via Bluetooth to a smart pet bowl during a setup process, a user interface for confirming connection to a smart pet bowl via Bluetooth during a setup process, a user interface connecting a smart pet bowl to a local area network, a user interface indicating that a smart pet bowl is ready to use, a user interface for physically positioning a smart pet bowl and litter box, and/or a user interface confirming the completion of a setup process. In some examples, profiles can be generated for multiple animals, if multiple animals are to use the same smart pet bowl. This profile can be used to establish baseline characteristics of each animal and track the animal's behaviors and characteristics over time.

In some embodiments, user interfaces for establishing an animal profile may be used. Examples of user interfaces for establishing an animal profile include, a user interface of a start screen for an animal profile establishment process, a user interface of an introductory screen for an animal profile establishment, a user interface for entering an animal's name, a user interface for entering an animal's sex, a user interface for entering an animal's reproductive status, a user interface of an introductory screen explaining capturing an animal's current body condition, a user interface for examining a specific animal body part, a user interface for examining an animal's profile, a user interface for examining an animal's waist, and/or a user interface of an ending screen for an animal profile establishment process.

Every animal is unique and has unique behaviors. Systems of monitoring feeding behaviors can utilize a variety of machine classifiers to track and distinguish between multiple animals without additional collars or gadgets, though additional secondary sensors may likewise be used in some examples. In some embodiments, information regarding particular events, such as an identification of which animal has used a smart pet bowl, can be solicited from a user. This information can be used to confirm the identity of an animal associated with a particular event, which can be used to retrain the machine classifiers and improve the accuracy of future results. For example, for an animal's feeding behavior, the system can request confirmation of which animal is associated with an event to provide that the system continues to deliver the best available insight(s). In some embodiments, once the system has developed a unique profile for a particular animal (e.g. after a threshold number of confirmations), the frequency of future confirmation requests may decrease.

In some embodiments, user interfaces for expert advice notifications are used. The user interfaces may include a user interface showing a notification indicating a pet should be monitored due to changes in feeding behavior, a user interface requesting confirmation that a smart pet bowl is correctly configured, a user interface requesting additional information regarding a pet's weight, a user interface requesting additional information regarding a pet's appearance, a user interface requesting additional information regarding a pet's elimination, and/or a user interface providing guidance to contact a veterinarian if changes in the pet's behaviors or conditions are cause for concern.

The systems of monitoring feeding behaviors and techniques described herein may provide a variety of benefits over existing systems (though it is noted that the systems and methods described herein can be used in some instances in conjunction with some of these existing monitoring systems). Existing monitoring systems typically rely on microchips implanted into the animals, RFID-enabled collars, and/or visual image recognition to identify individual animals. These systems can be very invasive (e.g., veterinarian intervention to implant a microchip into a specific location in the animal), are prone to failure (e.g., microchips can migrate to another location within the animal and be difficult to locate, RFID collars can wear out, be lost, and/or need frequent battery replacement/recharging, etc.).

Systems of monitoring feeding behaviors of pets in accordance with the present disclosure address some of limitations of existing systems, particularly in instances where some of these other systems interfere with the animal's normal behavior. The systems of monitoring feeding behaviors of the present disclosure can, for example, identify and track animals without relying on external identification, such as microchips or RFID collars. For example, a lapping or licking profile may be fairly unique to a first pet compared to a second pet, and the smart pet bowl and/or system can be used to differentiate between multiple pets. For example, in some examples, the systems of monitoring feeding behaviors described herein can identify the animal and its behavior without relying on image or video information, thereby avoiding the usage of cameras or human observers that can affect the animal's typical behaviors. That said, cameras and/or other sensors may be used to benefit the function of the smart pet bowl in some instances, such as for animal recognition, event splitting, or behavior classification, for example.

Figure 2:
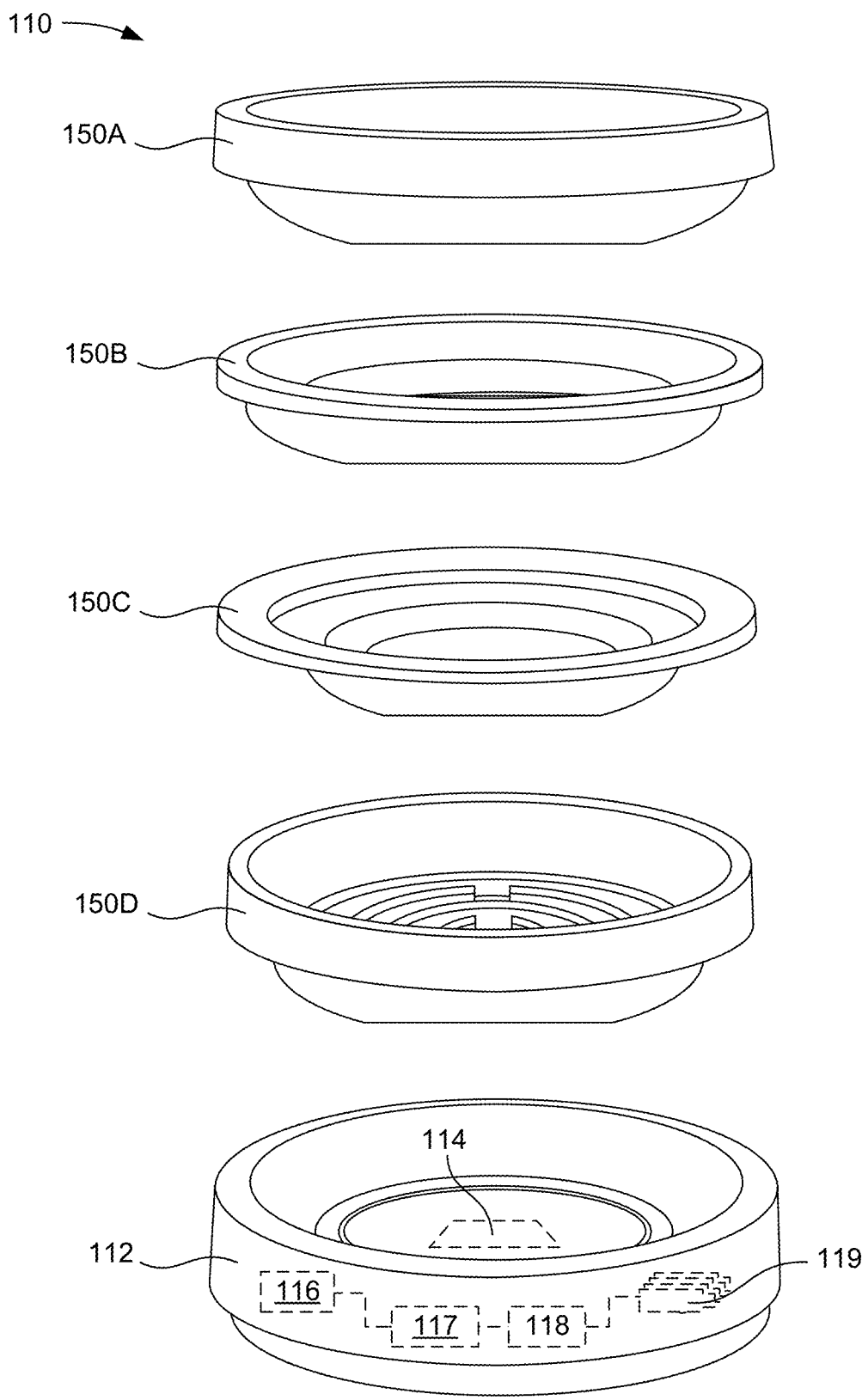
FIG. 2 illustrates an example smart pet bowl including a bowl support and multiple bowl inserts in accordance with the present disclosure.

Referring now to FIG. 2, an example smart pet bowl 110 is shown with a bowl support 112 and several different bowl inserts 150A-150D as options for insertion into the bowl support to interact with the load sensor 114. The load sensor is positioned to communicate load data from interactions with the smart pet bowl and more particularly, with the contents of the smart pet bowl, e.g., pet food and/or water. Thus, if a bowl insert is used, the bowl insert is configured to contact the region adjacent to the load sensor so that the load sensor picks up loads and load changes that occur within the bowl insert. As noted above, the bowl support may be the smart pet bowl in some examples (without a bowl insert) or the combination of the bowl support and the bowl insert may be the smart pet bowl. In this instance, either would be possible because the bowl support is bowl-shaped.

If a bowl insert 150A-150D is present, any of a number of configurations can be used, thus making the bowl support 112 (or base unit) fairly universal in some instances. For example, there may be different sized bowl supports based on the size and/or type of the animal, but then a variety of bowl inserts may be useable with the more universal bowl support. The four non-limiting examples of bowl inserts shown in FIG. 2 may each interact with the load sensor (and/or other sensors) when that particular bowl insert is placed on the bowl support. Thus, in this example, a bottom surface of the bowl insert is positioned to transfer loads during pet interactions while feeding to detect and generate load data for monitoring and/or interpreting for health concerns. Bowl insert 150A, for example, is shown as a deep, large diameter dish that may be suitable for providing higher volumes of pet food and/or water (or other liquids) to the animal. Bowl insert 150B, for example, is a shallow dish that reduces the volume capacity for the addition of pet food and/or water, and may be more suitable for a young pet, such as a young adult or youth dog or a medium sized cat. Bowl insert 150C is still shallower with a taper diameter, and may be more suitable for a puppy and/or a kitten. Bowl insert 150D is a larger dish that includes a maze configuration at the bottom. This configuration may be suitable to slow the pet feeding process down for animals that tend to eat too quickly. Regardless of the type of bowl insert used, load data can be collected and analyzed as described herein. In some examples, there may be an electrical connection between the bowl support and the bowl insert so that the smart pet bowl knows what type of bowl is placed thereon, thus providing still more information that can be monitored and/or analyzed for health concerns. Alternatively, the smart pet bowl can include a place for the user to enter the type of bowl insert being used.

In further detail regarding the smart pet bowl 112, in addition to the load sensor(s) 114 (and/or other sensors), the smart pet bowl (or bowl support) may of itself include a processor 116 and a memory 118. The processor and memory can be capable of controlling the load sensor and receiving load data from the load sensors. The load data can be stored temporarily in the memory or long term in the memory. A data communicator 117 can likewise be present in the smart pet bowl and be capable of communicating the load data to another device. For example, the data communicator can be a wireless networking device with employee wireless protocols such as Bluetooth or Wi-Fi. The data communicator can send the load data to a physically remote device capable of processing the load data, such as the analysis server systems 120 of FIG. 1. The data communicator can also transmit the data over a wired connection and can employ a data port such as a universal serial bus port. Alternatively, a memory slot can be capable of housing a removable memory card where the removable memory card can have the load data stored on it and then physically removed and transferred to another device for upload or analysis. In one embodiment, the processor and memory may be capable of analyzing the load data without sending the load data to a physically remote device such as the analysis server system.

The smart pet bowl 110 can include a power source 119. The power source can be a battery such as a replaceable battery or a rechargeable battery. The power source can be a wired power source that plugs into an electrical wall outlet. The power source can be a combination of a battery and a wired power source. The smart pet bowl may be built without a camera or image capturing device and may not utilize a secondary sensor(s), such as a proximity sensor, a camera, a microphone, an accelerometer, a gyroscope, an inertial measurement unit sensor, etc. Likewise, the animal may or may not be equipped with wearable sensors, such as an RFID collar or the like. A system of monitoring feeding behavior of a pet may include tracking the activity of the animal while using the smart pet bowl based solely on the load sensor(s) data, or in some instances, by combining the load sensor data with one or more of these secondary sensors. The data collected can then be processed to identify specific animal feeding behaviors, and in some instances, can be linked to health characteristics of the pet. A variety of events can be determined based on these characteristics and features. In some examples, a variety of machine learning classifiers can be used to determine these events as described in more detail herein. These events can include, but are not limited to human interactions, false triggers, accidental interaction with the smart pet bowl, and/or the like.

Figure 3A:
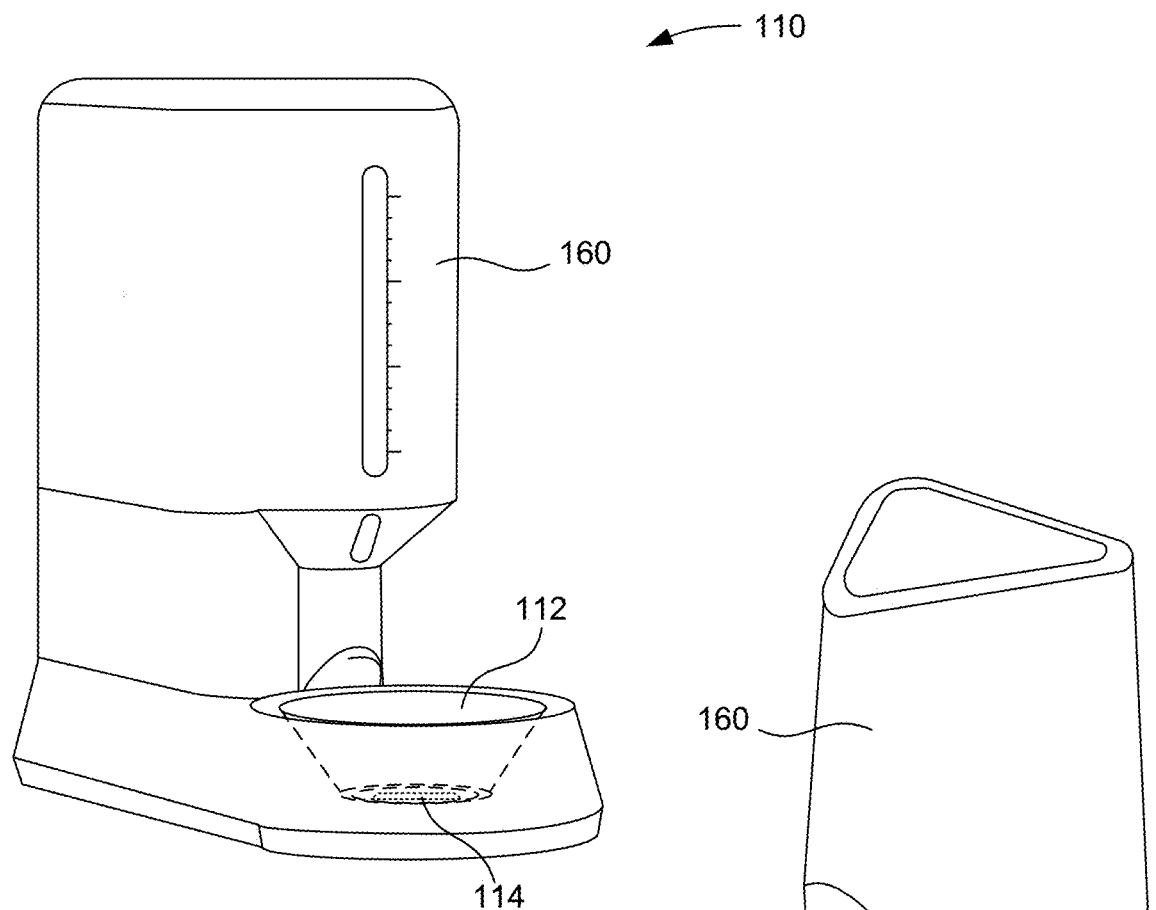
FIGS. 3A and 3B illustrate example smart pet bowl feeders in accordance with the present disclosure.
Figure 3B:
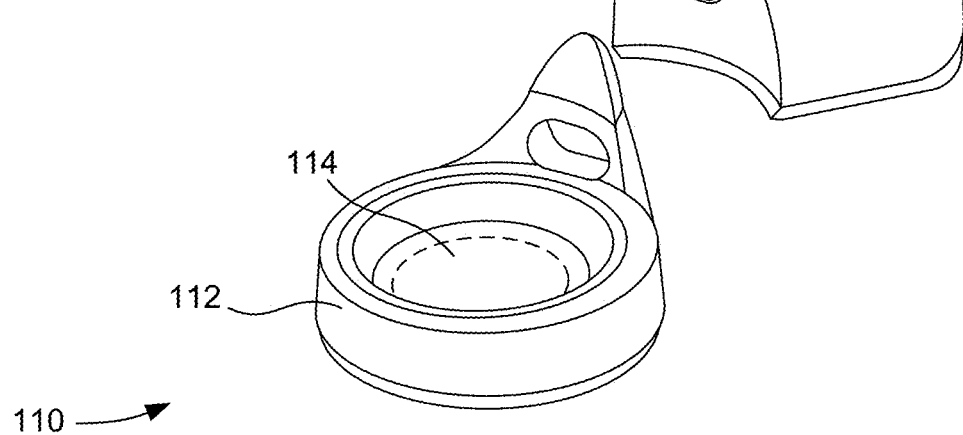

FIGS. 3A and 3B illustrate alternative smart pet bowls 110 that, in addition to carrying the same or similar components of that described in FIGS. 1 and 2, may also include an associated automatic feeder 160. As shown in FIG. 3A, the automatic feeder is integrated with the bowl support 112, which may be shaped to be the pet food-receiving vessel or may receive a separate bowl insert (not shown). However, as shown in FIG. 3B, the automatic feeder is shown as being modular. In this example, different bowl supports or smart pet bowls may be joined with the automatic feeder. In both examples, the smart pet bowl includes one or more load sensors 114 as previously described. Notably, by combining an automatic feeder with a smart pet bowl, the automatic feeder can deliver pet food on a schedule and/or can automatically modify pet feeding, e.g., times, amount, type, etc., based on data learned from the animal interaction with the smart pet bowl.

Referring now to the systems and methods shown by way of example and described in FIGS. 4-10 in particular, identifying human interactions, pre-processing (normalizing load values, cleaning data, identifying and/or trimming data e.g., meal breaks or unreliable data, etc., meal segments, feeding behaviors, meal sessions, features, and the like are described by example for understanding of the present disclosure. For example, a "meal session" can be conceptually divided into one or more individual feeding behaviors in terms of eating or drinking behaviors that are "count-based" (laps, licks, or bites) and/or "duration-based," (touching bowl, moving bowl, nosing food, pausing, eating, laps, or licks), as described previously. Notably, lapping, licking, or biting can be categorized by count and/or by duration, for example. Furthermore, "features" can be developed in load data that can be used to identify individual or collections of feeding behaviors based on counts and/or durations. Load data can be analyzed in time domain and/or frequency domain. Time domain features may include, but are not limited to, mean, median, standard deviation, range, autocorrelation, or the like. Frequency domain features may include, for example, median, energy, power spectral density, or the like. In further detail, load data can be analyzed as a total load, an individual load per load sensor, and/or at a feeding behavior level via a separation algorithm separating the load data into individual or small groups of feeding behavior interactions.

Time domain features and/or frequency domain features may be created as inputs for a computer network or other system acting as a machine classifier for classifying feeding behaviors within one or more meal session. The machine classifier can be used to analyze the load data to identify and/or label feeding behaviors over a period of time, e.g. 3 seconds of lapping followed by 2 seconds of licking, or in some examples, even identify micro-events within feeding behavior time frames, e.g., a single lick, within the load data. Based on the labels, feeding behaviors (or even individual animals) can be classified or categorized.

A variety of machine classifiers can be utilized including, but not limited to, decision trees (e.g. random forests), k-nearest neighbors, support vector machines (SVM), neural networks (NN), recurrent neural networks (RNN), convolutional neural networks (CNN), probabilistic neural networks (PNN), heuristics, regression, light gradient-boosting machine (GBM), and/or the like. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized. More specific machine classifiers when available, and general machine classifiers at other times, can further increase the accuracy of predictions.

In further detail regarding "meal session(s)," this can be conceptually divided into multiple feeding behaviors (eating and/or drinking) behaviors for classification. For example, some feeding behaviors can be count-based feeding behavior such as lapping, licking, or biting; and/or duration-based feeding behaviors such as touching the bowl, moving the bowl, nosing the food, pausing, biting/eating, lapping, licking, or a combination thereof. Notably, lapping, licking, or biting can be categorized by count and/or by duration, for example. With these feeding behaviors as examples, features can be developed in the load data for each feeding behavior phases to identify some or all of these particular feeding behaviors that occur either by count or duration. The load data can be analyzed in either or both a time domain or frequency domain. Time domain features may include, but are not limited to, mean, median, standard deviation, range, autocorrelation, or the like. Frequency domain features may include, for example, median, energy, power spectral density, or the like. In some embodiments, load data can be transformed into both time domain data and frequency domain data. For example, time domain data can be transformed into frequency domain data using a variety of techniques, such as a Fourier transform. Similarly, frequency domain data can be transformed into time domain data using a variety of techniques, such as an inverse Fourier transform. In some embodiments, time domain features and/or frequency domain features can be identified based on particular peaks, valleys, and/or flat spots within the time domain data and/or frequency domain data as described herein. Furthermore, time domain features and/or frequency domain features can be developed for a single load sensor, individual load sensors of a group, and/or all load sensors. Thus, features may be developed to assist with classifying feeding behaviors using a machine, one or more machine classifiers or modeling system.

In further detail, additional features may include, but are not limited to, the standard deviation of a load, a length of a flat spot, a crossover count of mean, a unique peak count, a distinct load value count, a ratio of distinct load values to event duration, a count of max load changes in individual sensors, a medium load bin percentage, a high load bin percentage, a high load bin volatility, a high load bin variance, an automatic correlation function lag or latency, curvature, linearity, count of peaks, energy, minimum power, a power standard deviation, maximum power, largest variance shift, a maximum Kulback-Leibler divergence, a Kulback-Leibler divergence time, spectral density entropy, automatic correlation function differentials, and/or a variation of an autoregressive model, to name a few. Feeding behaviors can thus be classified based on a correlation with the classified features. For example, selected features can be used as inputs to machine classifiers to classify the feeding behaviors, which may be count-based behaviors or duration-based behaviors as previously described. The feeding behaviors can include a label indicating the type of behavior and/or a confidence metric indicating the likelihood that the label is correct. Unreliable or less reliable data may be discounted or removed, for example. Thus, a machine classifier can be trained on a variety of training data indicating animal feeding behaviors and ground truth labels with the features as inputs, for example. Training data can thus be used to train the system and evaluation data can be used to evaluate the animal with the learning from the training data. For example, the feeding behaviors can be categorized based on the confidence metric indicating the likelihood that one or more series of counts or durations have been correctly classified. For example, the events can be classified into licking, lapping, nosing the bowl, touching the bowl, pausing, and/or any of a variety of other feeding behaviors as described herein.

Time domain features and/or frequency domain features may be created as inputs for a computer network or other system acting as a machine classifier for classifying feeding behaviors within one or more meal sessions. The machine classifier can be used to analyze the load data to identify and/or label feeding behaviors over a period of time, e.g. 3 seconds of lapping followed by 2 seconds of licking, or in some examples, even identify micro-events within feeding behavior time frames, e.g., a single lick, within the load data. Based on the labels, feeding behaviors (or even individual animals) can be classified or categorized.

A variety of machine classifiers can be utilized including, but not limited to, decision trees (e.g. random forests), k-nearest neighbors, support vector machines (SVM), neural networks (NN), recurrent neural networks (RNN), artificial neural networks (ANN), convolutional neural networks (CNN), probabilistic neural networks (PNN), heuristics, regression, light gradient-boosting machine (GBM), and/or the like. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized. More specific machine classifiers when available, and general machine classifiers at other times can further increase the accuracy of predictions.

Figure 4:
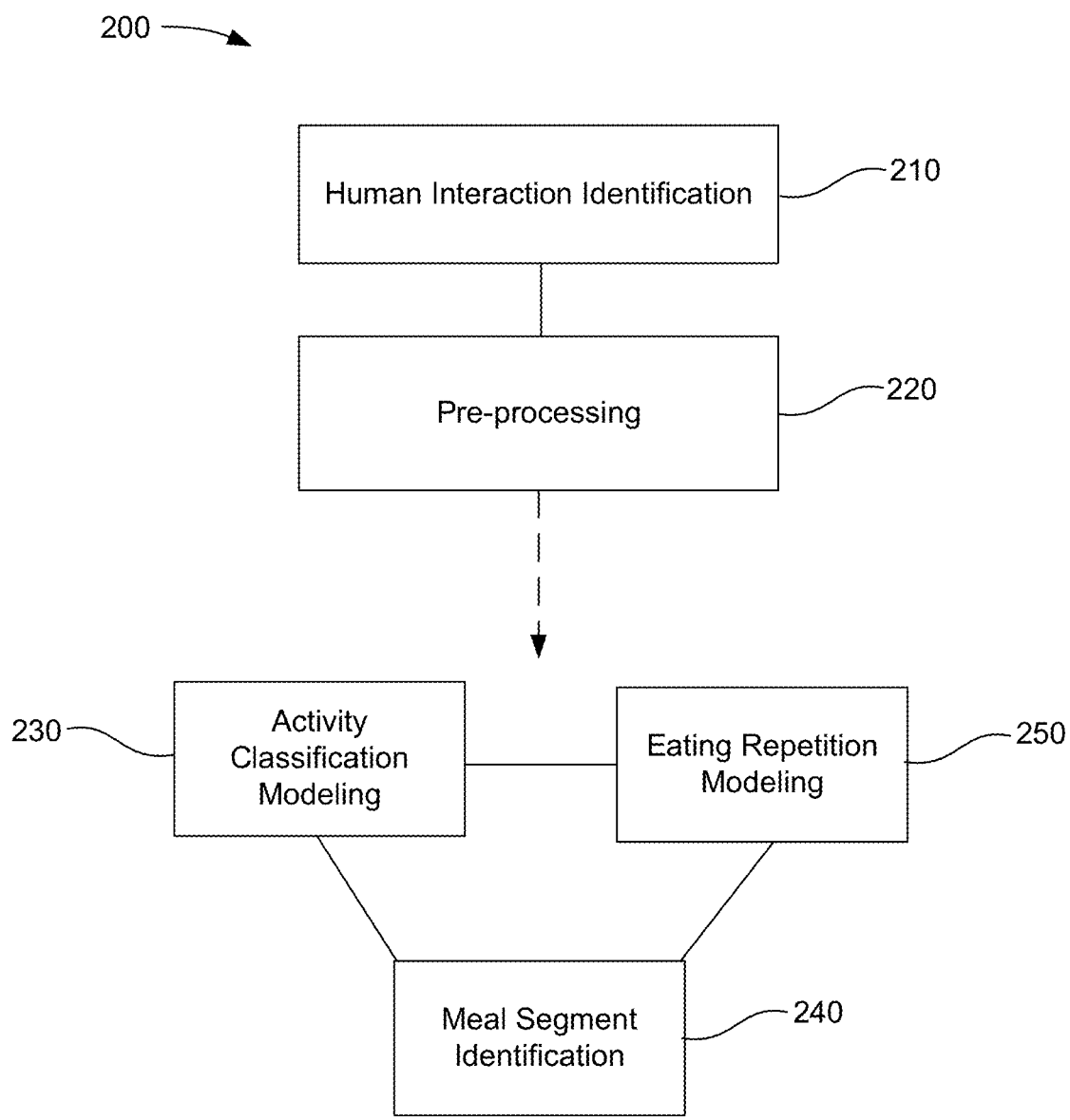
FIG. 4 is a flowchart illustrating example data collection and processing systems and methods for monitoring pet feeding behaviors in accordance with the present disclosure.

Referring now more specifically to FIG. 4, this flowchart illustrates example data collection and processing methods 200 and related systems that may be implemented in monitoring the feeding behavior of pets. For example, in monitoring the feeding behavior, steps may include activity classification modeling 230, meal segment identification 240, and/or feeding repetition modeling 250 taken in any order. For example, activity classification modeling may be in the form of a build or score activity classification model, and may include aggregating data using a rolling time window, e.g., from about 0.01 second to about 5 seconds, from about 0.05 second to about 3 seconds, or from about 0.1 second to about 1 second. The processing may also include meal segment identification. Meal segment identification may include identification of the start and end point of a meal session, computing food offered and food remaining after the meal session, and/or trimming non-meal segments for meal sessions, for example. In some examples, processing can likewise include feeding repetition modeling, which may be based on build or score eating (or drinking) repetition regression modeling. Feeding repetition modeling may, for example, entail providing aggregating data, e.g., at the meal session level.

When modeling feeding behavior of pets, in order to establish the types of load data signatures that may be useful in characterizing the feeding behavior of a type of animal, e.g., cats, dogs, etc., several modeling considerations can be made. For example, in modeling animal feeding behavior, typically many different animals of the same type are used. "Truth data" may be collected for comparison purposes so that it can be correlated to the load sensor data collected for individual feeding behaviors as well as for overall modeling of for the smart pet bowls of the present disclosure. Truth data can be collected a variety ways, such as real time observation, but videography works well because of the ability of a technician to pause, slow, rewind, etc., when carefully considering feeding behaviors. Truth data in some instances may include a combination of videography and sensor data once that sensor data is found to be reliable. Thus, the truth data can be compared against "training data" that is simultaneously collected from the same multiple animals can be based on the data collected using the load sensor(s). Thus, correlations can be made based on load sensor signal of pet feeding signature behaviors that align with the observable pet feeding behavior data collected by videography. The truth data (from video labels) and training data (from load sensor and raw video) can be correlated to "train" the smart pet bowl so that the model can be built. In other words, training can occur to establish correct load sensor data and raw video correlates with specific feeding behaviors. For example, training data as correlated with the video truth data can be used to establish load sensor signatures for feeding behaviors such as eating, lapping, licking, food drop, etc. Once those feeding behaviors are established with identifiable load sensor signals unique to that behavior, "testing data" can be collected again using a group of the same type of animals, e.g., dogs, cats, etc., to test various models that return results that accurately characterize feeding behaviors. To the extent that truth data is misaligned or different than the data collected using the load sensors, that data can be cleaned up from the overall data set, e.g., excised from the data set. Again, when establishing an appropriate model, video "truth data" again can be used to verify that the model returns good feeding behavior results that are accurate enough to be useful. As an example, any of a number of models can be used as described elsewhere herein.

In some more detailed examples, collection of data and data processing 200 in monitoring the feeding behavior of pets may include carrying out some additional steps that typically would occur prior to monitoring the feeding behavior. For example, prior to processing in accordance with 230, 240, and/or 250 and described above, identifying human interaction 210 with the smart pet bowl that may show up in the data as load signal unrelated to animal feeding can be excised from the meal segment. In further detail, the load signal data may be pre-processed 220 to clean up the data further to improve the reliability of the meal segment data. For example, "truth data" collected from videography, for example, can be compared to identify times where there is a human interaction with the smart pet bowl. When those types of load signals are detected, they may be excised from the data set, for example, as relating to human interaction, e.g., placing bowl, picking bowl up, pouring food into the bowl, etc. Those type of interactions are typically very different in frequency and amplitude than are sensed during normal pet feeding activities. Pre-processing may include normalizing load values and/or identifying and cleaning data from the data set to be analyzed that does not particularly relate to the feeding behavior, e.g., identifying and trimming irrelevant collected data, identifying breaks in the meal session, and/or removing data that may be less reliable than any collected data, etc. Again in training and/or testing the smart pet bowls for pre-processing of data, "truth data" can be compared to training data and/or testing data to identify load sensor signals that correspond to useable load sensor frequency response and less reliable load sensor frequency response.

Modeling may be used based on machine learning or artificial intelligence. An example of how data can be cleaned to provide a more representative sample to learn about the feeding behaviors of a pet is described more fully in Example 1 hereinafter. Identification of human interaction may include, for example, identifying pre-meal human or other unusual interactions with the smart pet bowl or contents thereof, identifying post-meal human or other unusual interactions with the smart pet bowl or contents thereof, and/or trimming these human or other unusual interactions from the load data collected. Further detail regarding identifying and trimming human interactions is described in greater detail in connections with Example 1 hereinafter.

It is noted that although the systems and methods described in FIG. 4 above and hereinafter use other flowcharts, it will be appreciated that many other methods of performing the acts associated with these method may be used. For example, the order of some of the blocks may be changed, certain blocks may be combined with other blocks, one or more blocks may be repeated, and/or some of the blocks described may be optional. The methods may be performed by processing logic that may include hardware (circuitry, dedicated logic, etc.), software, or a combination of both. The method or process may be implemented and executed as instructed on a machine, where the instructions are included on at least one computer readable medium or one non-transitory machine-readable storage medium.

Figure 5:
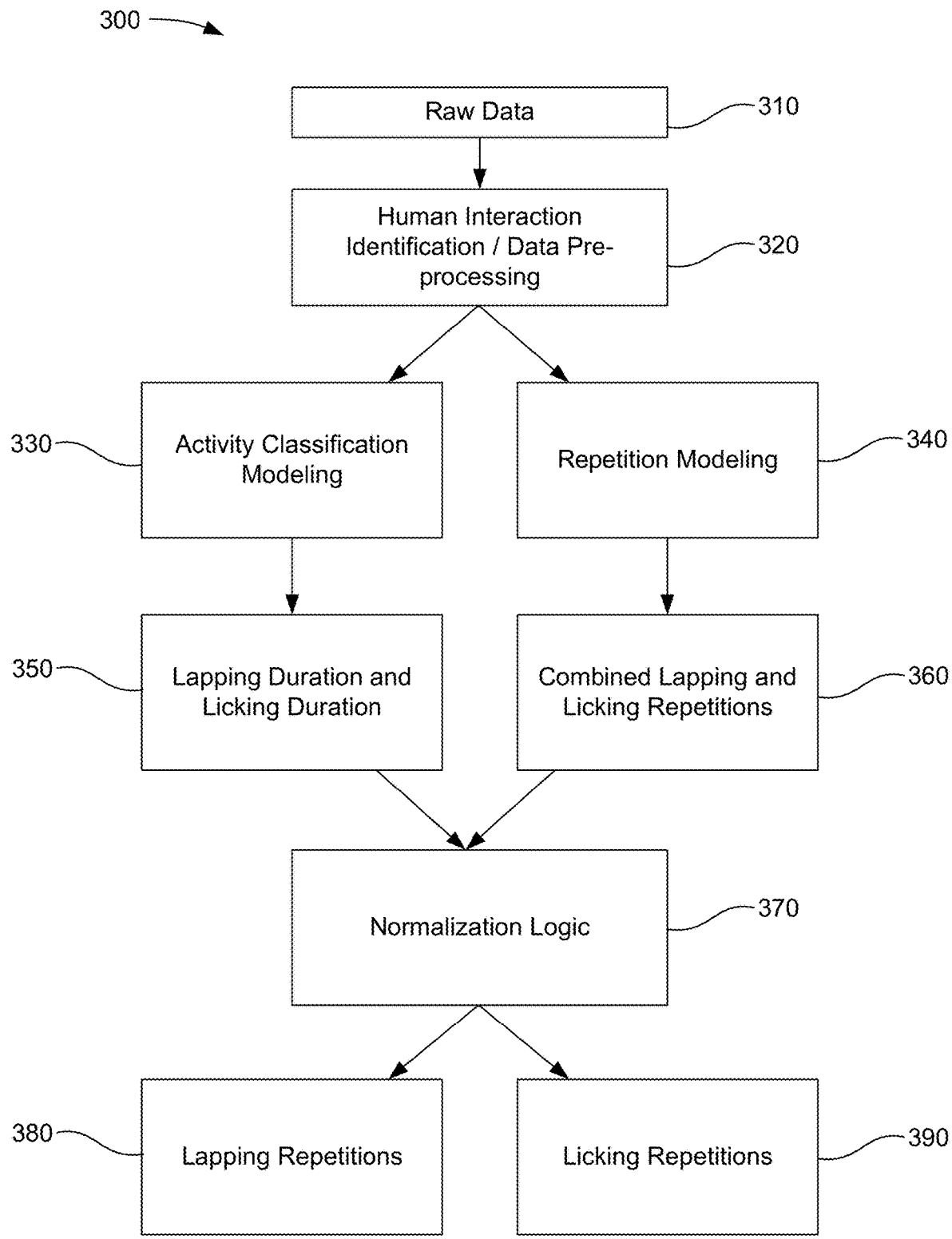
FIG. 5 is a flowchart illustrating example data collection and processing systems and methods for monitoring pet drinking behaviors in accordance with the present disclosure.

Referring now to FIG. 5, a more detailed flow diagram of data collection and processing 300 for counting drinking repetitions, or "reps," is shown by way of example. Notably, there are other ways of organizing the counting of drinking reps, but this example provides one acceptable method that may be implemented. In accordance with this example, raw data 310 is collected and in some examples, some data pre-processing 320 can be carried out, such as that described in accordance with FIG. 4, e.g., identifying human interactions for removal. Pre-processing may likewise include identifying breaks based on computing normalized load values with modeling or using a machine classifier, which may include, but is not limited to, decision trees (e.g. random forests), k-nearest neighbors, support vector machines (SVM), neural networks (NN), recurrent neural networks (RNN), artificial neural networks (ANN), convolutional neural networks (CNN), probabilistic neural networks (PNN), heuristics, regression, light gradient-boosting machines (GBM), and/or the like. Heuristic modeling, for example, may be used and can include any form of computer-based problem solving or discovery that generates sufficient, even if imperfect, results as an approximation in pursuit or search for a solution to a problem. Heuristic methodology may allow for speeding up the process of discovery to reach a satisfactory result. Thus, removing identified breaks, even by fast approximation, may typically improve the data collected for subsequent processing. After the processing (or a portion thereof) is complete in this example, processing of the data may include activity classification modeling 330 and lapping duration and licking duration 350 as separate components and/or in other examples, processing the data may include repetition modeling 340 and combined lapping and licking repetitions 360. This processed data can then be subjected to normalization logic 370, resulting in data related to lapping repetitions 380 and licking repetitions 390.

In further detail regarding modeling, such as the activity classification modeling and/or repetition modeling described by example above, classifying eating and/or drinking behaviors can be established by other modeling protocols as well. Regardless of what type of modeling is used, the smart pet bowl can gather data based on different load signatures captured can provide information as to what type of activity is occurring at a given time during the meal session. This can lead to the monitoring of feeding behavior and in some instances, can lead to generating insights related to the health and/or well-being of the pet.

Example feeding behaviors that can be captured may be grouped into a few larger categories, such as animal interaction, repetition (reps), consumption, and/or break(s). Table 1 illustrates a few example non-limiting behaviors that can be captured using the collection of load data from a smart pet bowl during a meal session, as follows.

TABLE 1

| Category | Behavior |
|---|---|
| Example Meal Session Categories and Behaviors Capturable Using Load Data | |
| Interaction | Frequency Interacting with Bowl (interactions per minute) Time Interacting with Bowl (average length; fraction of interaction duration per meal session) |

TABLE 1-continued

| Category | Behavior |
|---|---|
| Example Meal Session Categories and Behaviors Capturable Using Load Data | |
| Repetition | Food Consumed Per Bite (number of bites per minute) Frequency of Each Dog Bite (amount consumed per bite; average amount per bite within interaction) |
| Consumption | Rate of Consumption (amount consumed per second; average amount consumed per second of single interaction) |
| Break | Frequency of Eating Breaks (number of breaks per minute) Length of Eating Breaks (average length of breaks; fraction of break duration per meal session) |

FIGS. 6-9 illustrate several example artificial intelligence (AI) processing protocols that can be used for multiple types of animals for feeding and/or multiple types of animals for drinking. In these examples, onboarding data entered by the animal custodian or pet owner can be combined with more continuous data collected by the smart pet bowl or system for monitoring pet feeding behavior. By way of definitions, FIGS. 6-9 illustrate various types of data that may be gathered and processed by computer or computer networks. Other types of data collection and/or processing locations may be implemented in manners other than that depicted in these examples. For example, types of data gathered as noted in FIGS. 6-9 may include data regarding animal feeding sessions (notated as "s" in the FIGS.), animal interactions with the smart pet bowl (notated as "i"), time increments or windows of time (notated as "t"), or combined interactions/time increments (notated as "i/t"). In further detail, computing or processing data may occur for any of the processes shown at any location, such as at the smart pet bowl, at a local computer, at a local client device or smartphone (or tablet), at any location suitable for edge computing (closer to the data source than a centralized server or cloud-based location), at a centralized server, or in the cloud, for example. In many instances, a "cloud" symbol is used by way of example to illustrate that processing in this example is cloud based, but could be at any location. Regarding computing or processing in general, various computing methodologies are also exemplified in FIGS. 6-9, and include cloud computing (notated as "c") and/or edge computing (notated as "e").

Figure 6:
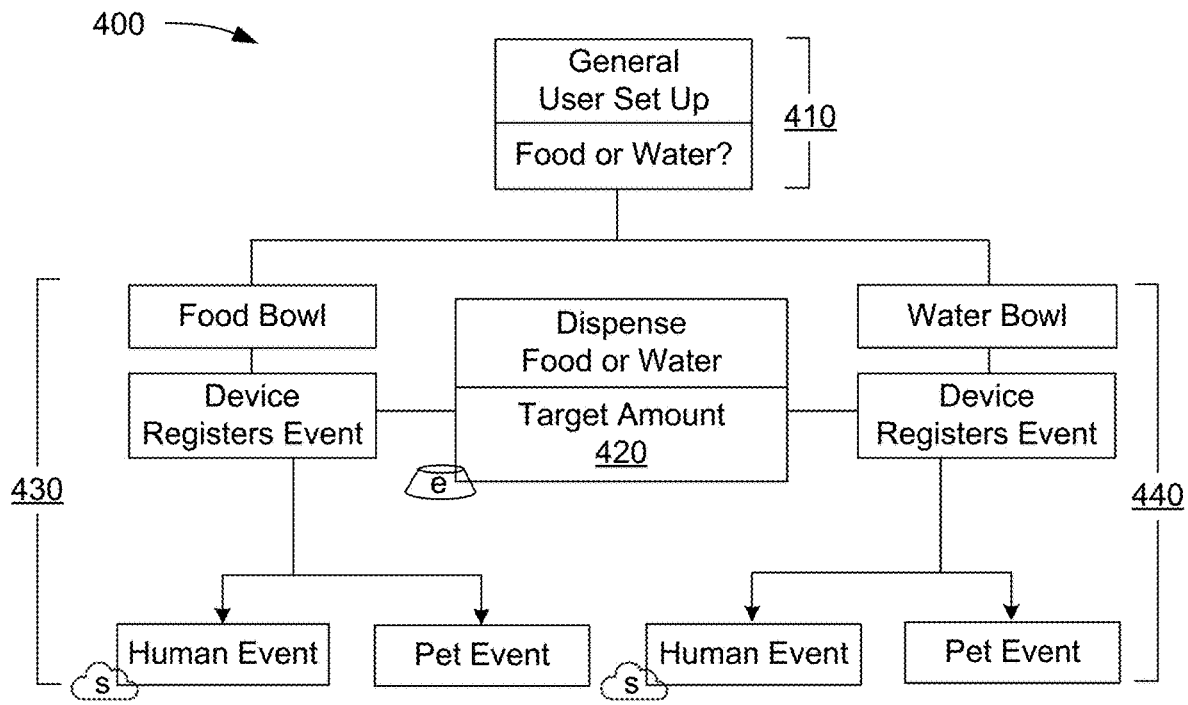
FIGS. 6-9 are more specific flowcharts illustrating example artificial intelligence or machine learning systems and methods for monitoring pet feeding behaviors in accordance with the present disclosure.

Referring more specifically to FIG. 6, a system 400 for monitoring pet feeding behavior (or a smart pet bowl) may be set up by user onboarding 410, including general user setup. General setup may entail entering the type of animal, the breed of the animal, the weight of the animal, body condition score of the animal, reproductive status of the animal, age of the animal and/or other information that may be pertinent to collecting and processing relevant data related to feeding. If the smart bowl is suitable for pet food or water, then that used could likewise be entered by the user or alternatively, the smart pet bowl could sense the type of food or water (or other liquid) that may be present. If the smart pet bowl is for food processing 430, the device registers this event categorization and, in this example, the processing may be used to determine if load sensors of the smart pet bowl are triggered as a result of a human event or a pet event. If the smart pet bowl is for water processing 440, the device registers this event categorization and, in this example, the processing may be used to determine if load sensors of the smart pet bowl are triggered as a result of a human event or a pet event. More detailed artificial intelligence and other computer processing is detailed further in FIGS. 8 and 9 hereinafter.

Figure 7:
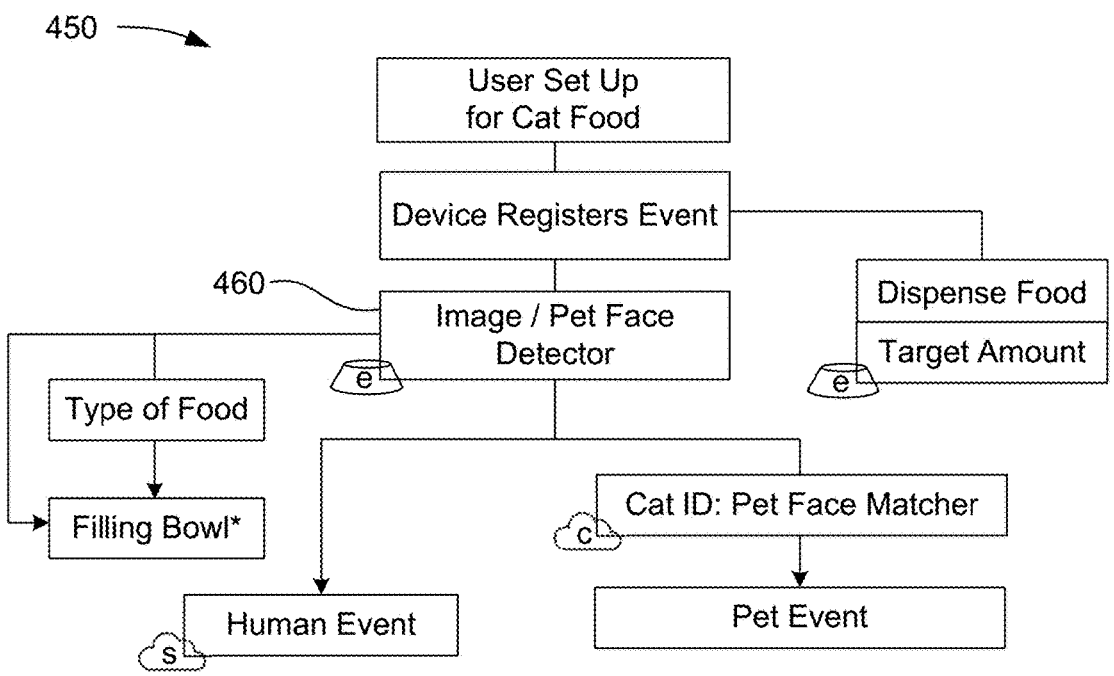

As shown in FIG. 7, a smart pet bowl can be set up, by way of example, with an augmented cat food process 450. Notably, cloud computing (c) and edge computing (c) is shown by way of example only, as previously mentioned. This process may be utilized in place of the food pet bowl processing shown at 430 in FIG. 6. In this augmented process (or system), in addition to the load sensors shown and described previously, a secondary sensor can be used for pet detection, for example, by scanning or otherwise capturing an image and/or pet face detector. A type of food may be selected for filling the bowl or the bowl may be filled directly without determining the type of food, e.g., one type of food available. Again, a human event may be distinguished from a pet event, but in this example, the system or method may utilize a cat identification (Cat ID) to match with the face of a specific cat using the captured image as a precursor to registering the pet event to the particular cat. In some examples, the smart pet bowls of the present disclosure bowls can provide personalized insights for individual animals, e.g., individual pets in a multi-pet household. Thus, the smart pet bowl may be equipped with one or more secondary sensors, e.g., a proximity sensor, a camera, a microphone, an accelerometer, a gyroscope, an inertial measurement unit sensor, and/or a radar, etc. In other examples, the pet can be identified using the load data during eating and/or drinking, as multiple animals may have different eating behavior profiles that may be able to be differentiated in some examples. In some more specific examples, cat or other animal identification can be done by image recognition (embedding from an image) using a camera, and/or dog or other animal identification can be done using load sensor data using modeling that that closely approximates real world data collected visually for verification.

Figure 8:
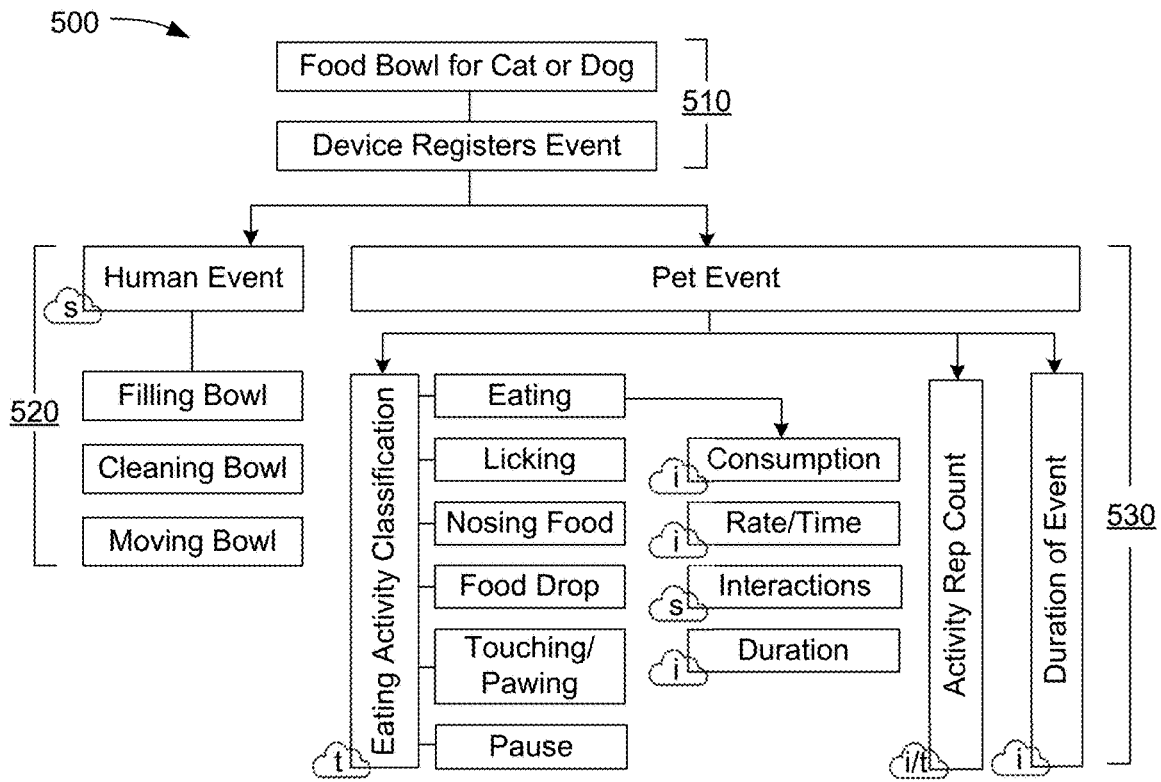
Figure 9:
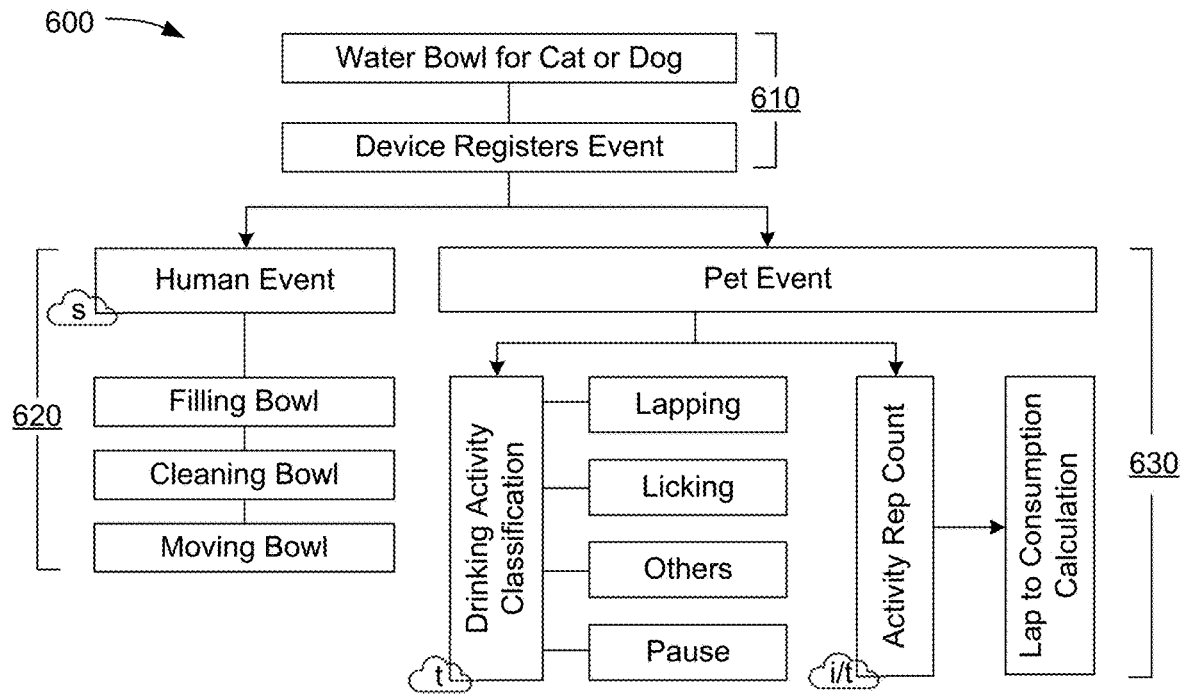

FIGS. 8 and 9 illustrate additional detail regarding the AI and/or other protocols that can be used to process human events and/or pet events. For example, as shown in FIG. 8, after the smart pet bowl is set up and the device registers the relevant information 510, e.g., cat or dog, pet food details, animal weight, animal breed, body condition score, reproductive status, age, etc., as entered by the user or detected by the smart pet bowl or peripheries, the system 500 for monitoring pet feeding behavior (or a smart pet bowl) can separate human events 520 from pet events 530 for processing. Human events detailed in this example may include filling of the smart pet bowl, cleaning the smart pet bowl, moving the smart pet bowl, e.g., lifting, etc. Pet events, on the other hand, are more fundamental to the presently disclosed invention, as human events are primarily identified for trimming or removal from the data collected in order to more accurately understand the feeding behaviors of the animal. Pet events that may be related to a dog that is eating pet food may be classified using load data collected and analyzed as described herein. More specifically, example eating activity classifications may include eating, lapping, licking, nosing food (moving food with nose), dropping food, touching the bowl, and/or pausing to eat. With respect to a feeding cat, eating activity classifications may include, for example, eating, lapping, licking, nosing food (moving food with nose), dropping food, shoveling, touching the bowl or pawing food, and/or pausing to eat. Eating may be further characterized by food consumption, rate of eating, interactions with food, and/or duration of meal, for example.

In collecting this type of data, eating activities may be processed based on the activity rep count and/or the duration of event, for example.

As shown in FIG. 9, again after the smart pet bowl is set up and the device registers the relevant information 610, e.g., cat or dog, pet food details, animal weight, animal breed, etc., as entered by the user or detected by the smart pet bowl or peripheries, the system 600 for monitoring pet feeding behavior (or a smart pet bowl) can separate human events 620 from pet events 630 for processing. Human events detailed in this example may include filling of the smart pet bowl, cleaning the smart pet bowl, moving the smart pet bowl, e.g., lifting, etc. Pet events, on the other hand, are more fundamental to the presently disclosed invention, as human events are primarily identified for trimming or removal from the data collected in order to more accurately understand the feeding behaviors of the animal. Pet events that may be related to a dog that is drinking pet food may be classified using load data collected and analyzed as described herein. More specifically, example drinking activity classifications may include lapping, licking, pausing in drinking, and/or any other behavior associated with drinking. With respect to a cat, drinking activity classifications may also include, for example, lapping, licking pausing in drinking, and/or other behaviors identified that may be related to drinking of a cat. In collecting this type of data, drinking activities may be processed based on the activity rep count and/or the duration of event, for example.

Figure 10:
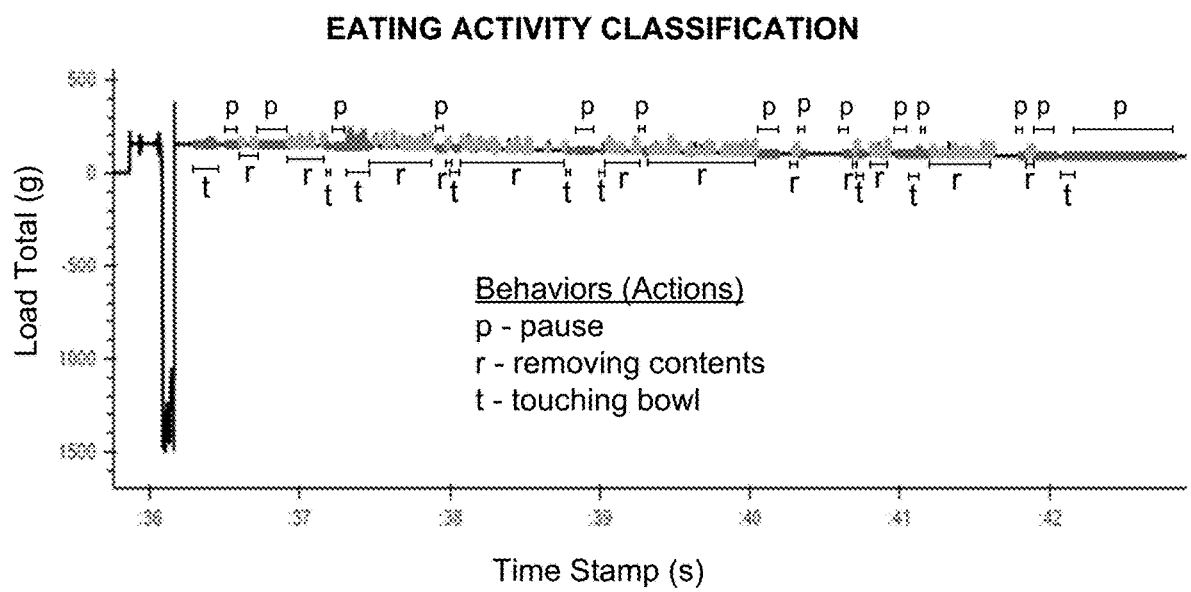
FIG. 10 is a graph illustrating examples of identifying eating activity classification in accordance with the present disclosure.

FIG. 10 illustrates an eating activity classification example that may include identifying activities related to food dropping, nosing food, removing contents (eating), bowl touching, and/or any of the other activities related to eating. More specifically, FIG. 10 includes data collected and classified for how a dog is interacting with a smart pet bowl (based on load sensor data) using 0.3 second sequential time increments, e.g., 0.3 second rolling time window. In other words, every 0.3 seconds, one or more activity is identified and characterized. For simplicity in illustrating this example, three of the possible activities are identified, including eating pause (p), removing contents (r), and bowl touching (t). This data set does not show removal of any human interaction, which may be indicated by the large load swing shown at the left of the graph.

Figure 11:
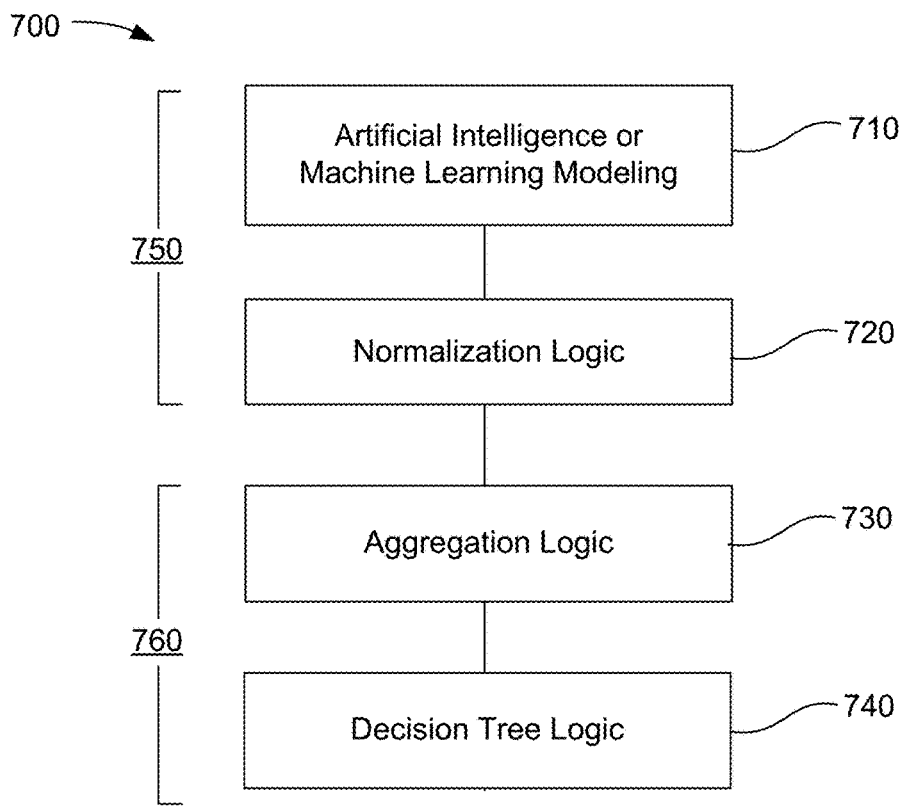
FIG. 11 is a flowchart illustrating example health insight systems and methods in accordance with the present disclosure.

FIG. 11 illustrates an example system or method 700 that can be used to generate health insights that may be obtainable in collecting the feeding data using the smart pet bowl or a related system of the present disclosure. In this example, a variety of logic systems or ensemble logic can be combined in processing data related to a feeding event 750 and data collected across various time ranges 760. For example, a feeding event can be registered based on raw classifications. These feeding events can be registered, for example, using artificial intelligence and/or machine learning (AI/ML) 710. A machine classifier or other system may be used for modeling eating, drinking, counting reps, durations, etc. Example machine classifiers may include decision trees (e.g. random forests), k-nearest neighbors, support vector machines (SVM), neural networks (NN), recurrent neural networks (RNN), convolutional neural networks (CNN), probabilistic neural networks (PNN), heuristics, regression, light gradient-boosting machine (GBM), and/or the like.

Normalization logic 720 can process the raw classifications to generate a prediction. In some examples, user inputs and/or labels can be considered and may override normalization logic predictions if appropriate. Regarding data collected across various time ranges, the system or method can utilize aggregation logic 730. With aggregation logic, the normalized predictions are collated to generate an aggregated result. In some examples, the aggregated result can then be used in conjunction with certain decision tree logic 740. Such decision tree logic may, for example, alert an animal custodian or pet owner of relevant information or insights based on those feeding behaviors. In one example, the decision tree logic may be used as part of a Decision Tree Logic system, which can be used with other logic systems to translate data into meaningful insights to give the pet a voice regarding its health and wellbeing as well as empower pet owners to feel confident in their decisions made on behalf of their pets.

Examples of information that may be obtainable by the data collected using the smart pet bowl and/or systems of the present disclosure may include event information or insights, daily information or insights, weekly information or insights, monthly information or insights, yearly information or insights, etc. For example, event information that may be given to a pet owner may include time spent at each activity, reps of each activity, number of food or water interactions, grams consumed per bite, total grams consumed, etc. Examples of daily information may include time of day of feeding, total consumption on a given day, average duration of feeding, average rate of feeding, average number of events, etc. Monthly information may include trends in feeding, total consumption, average duration of feeding, average rate of feeding, average number of events per day, etc.

Regarding health and behavior insights that may be associated with changes from this type of data includes meal or flavor preference, level of stress and anxiety, acute illness or chronic disease, dental problems, etc. With these types of information and insights collected, determined, and reported, pet owners can gain confirmation that they are taking care of their pet properly. As an example of how this may work in some instances, a pet would use a bowl to develop a pet feeding signature that correlates with a feeding behavior. Changes in the feeding signature may be detected and the pet owner notified. Upon notification, the pet owner may make adjustments in the best interest of the pet.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs, or any other similar devices. The instructions may be configured to be executed by one or more processors which, when executing the series of computer instructions, performs or facilitates the performance of all or part of the disclosed methods and procedures. As will be appreciated by one of skill in the art, the functionality of the program modules may be combined or distributed as desired in various aspects of the disclosure.

In accordance with the disclosure herein, the following examples are illustrative of several embodiments of the present technology.

1. An example method of monitoring feeding behavior of a pet, under the control of at least one processor, comprising:
   obtaining load data from a load sensor of a pet bowl while the pet is interacting with contents of the pet bowl, wherein the load sensor has a sensitivity of +/−50 grams or less and the load data is obtained at a sample rate from 10 samples to 150 samples per second;
   sequentially grouping the load data in 0.01 second to 5 second time increments, wherein individual time increments include multiple samples; and
   identifying a feeding behavior occurring within one or more of the time increments based on the load data resulting from the pet interacting with the pet bowl or the contents of the pet bowl.

2. The method of example 1, further comprising excluding load data in identifying the feeding behavior if determined to be a result of human interaction, a false trigger, or an accidental interaction with the pet bowl or the contents of the pet bowl.

3. The method of any one of examples 1-2, wherein the feeding behavior is a count-based feeding behavior selected from lapping, licking, or biting.

4. The method of example 3, further comprising characterizing the count-based feeding behavior by counting individual micro-events of the feeding behavior within a single time increment or a time period spanning multiple time increments, wherein the individual micro-events include individual laps, individual licks, or individual bites.

5. The method of example 4, wherein characterizing the count-based feeding behavior includes characterizing periods of time spanning one or multiple time increments where the count-based behavior is not occurring.

6. The method of any one of examples 1-5, wherein the feeding behavior is a duration-based behavior selected from the pet touching the bowl, moving the bowl, nosing the food, pausing, eating, lapping, licking, or biting.

7. The method of example 6, further comprising characterizing the duration-based feeding behavior by sequentially mapping the time increments in which the duration-based behavior occurs or is not occurring.

8. The method of any one of examples 1-7, further comprising notifying a custodian of the pet of the feeding behavior or a change in the pet feeding behavior.

9. The method of example 8, wherein notifying the custodian of the pet includes warning the custodian that the changes in the pet feeding behavior may be correlated to a potential health or behavior issue.

10. The method of any one of examples 1-9, further comprising obtaining secondary data from a secondary sensor associated with the pet bowl, wherein the secondary sensor includes a proximity sensor, a camera, a microphone, an accelerometer, a gyroscope, an inertial measurement unit sensor, or a combination thereof.

11. The method of any one of examples 1-10, wherein the pet bowl is a dog water bowl, and wherein the load sensor has a sensitivity of +/−4 grams or less, the sample rate is from 15 samples to 75 samples per second, and the time increments are at least about 0.4 second.

12. The method of any one of examples 1-10, wherein the pet bowl is a dog food bowl, and wherein the load sensor has a sensitivity of +/−4 grams or less, the sample rate is from 15 samples to 75 samples per second, and the time increments are at least about 0.3 second.

13. The method of any one of examples 1-10, wherein the pet bowl is a cat water bowl, and wherein the load sensor has a sensitivity of +/−2 grams or less, the sample rate is from 15 samples to 75 samples per second, and the time increments are at least about 0.4 second.

14. The method of any one of examples 1-10, wherein the pet bowl is a cat food bowl, and wherein the load sensor has a sensitivity of +/−2 grams or less, the sample rate is from 15 samples to 75 samples per second, and the time increments are at least about 0.3 second.

15. The method of any one of examples 1-10, further comprising generating a feeding behavior model for the pet, including identifying the feeding behavior of the pet based on frequency of feeding, pet feeding signature behaviors, or a combination thereof.

16. The method of any one of examples 1-15, further comprising identifying an identity of a pet in a multi-pet household.

17. An example non-transitory machine readable storage medium having instructions embodied thereon, the instructions when executed cause a processor to perform a method of monitoring feeding behavior of a pet, comprising:
  obtaining load data from a load sensor of a pet bowl while the pet is interacting with the contents of the pet bowl, wherein the load sensor has a sensitivity of +/−50 grams or less and the load data is obtained at a sample rate from 10 to 150 samples per second;
  sequentially grouping the load data in 0.01 second to 5 second time increments, wherein individual time increments include multiple samples; and
  identifying a feeding behavior occurring within one or more of the time increments based on the load data resulting from the pet interacting with the pet bowl or the contents of the pet bowl.

18. The non-transitory machine readable storage medium of example 17, wherein monitoring feeding behavior of the pet includes monitoring a count-based feeding behavior selected from lapping, licking, or biting.

19. The non-transitory machine readable storage medium of any one of examples 17-18, wherein monitoring feeding behavior of the pet includes monitoring a duration-based behavior selected from touching the bowl, moving the bowl, nosing the food, pausing, eating, lapping, licking, or a combination thereof.

20. The non-transitory machine readable storage medium of any one of examples 17-19, wherein monitoring feeding behavior of the pet includes notifying a custodian of the pet of: the feeding behavior, a change in the feeding behavior, a potential health issue associated with the feeding behavior, or a combination thereof.

21. The non-transitory machine readable storage medium of any one of examples 17-20, wherein the load sensor has a sensitivity of +/−4 grams or less, the sample rate is from 15 samples to 75 samples per second and the time increments are at least about 0.3 second.

22. The non-transitory machine readable storage medium of any one of examples 17-21, wherein monitoring feeding behavior of the pet includes identifying the pet for monitoring when the pet is from a multi-pet household.

Definitions

As used herein, "about," "approximately" and "substantially" are understood to refer to numbers in a range of numerals, for example the range of −10% to +10% of the referenced number, −5% to +5% of the referenced number, −1% to +1% of the referenced number, or −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "a component" or "the component" includes two or more components.

The words "comprise," "comprises" and "comprising" are to be interpreted inclusively rather than exclusively. Likewise, the terms "include," "including" and "or" should all be construed to be inclusive, unless such a construction is clearly prohibited from the context. Thus, a disclosure of an embodiment using the term "comprising" includes a disclosure of embodiments "consisting essentially of" and "consisting of" the components identified.

The term "and/or" used in the context of "X and/or Y" should be interpreted as "X," or "Y," or "X and Y." Similarly, "at least one of X or Y" should be interpreted as "X," or "Y," or "X and Y."

Where used herein, the terms "example" and "such as," particularly when followed by a listing of terms, are merely exemplary and illustrative and should not be deemed to be exclusive or comprehensive.

The terms "pet" and "animal" are used synonymously herein and mean any animal which can use a smart pet bowl or related system of the present disclosure, non-limiting examples of which include a cat, a dog, a rat, a ferret, a hamster, a rabbit, an iguana, a pig, or a bird. The pet can be any suitable animal, and the present disclosure is not limited to a specific pet animal. A smart pet bowl may or may not be specifically adapted for a specific type of animal, e.g., dog or cat, and/or may or may not be specifically adapted for a specific feeding activity, e.g., liquid (water, milk, etc.) or food (dry kibble, wet or semi-wet food, etc.).

As used herein, ranges are in shorthand so as to avoid having to list and describe each and every value within the range. Any appropriate value within the range can be selected, where appropriate, as the upper value, lower value, or the terminus of the range, and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1% to about 5%" should be interpreted to include the explicitly recited values of about 1% to about 5%, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting one numerical value. Furthermore, such an interpretation should apply regardless of the breadth of the range or the characteristics being described.

The term "example(s)" or "embodiment(s)," particularly when followed by a listing of terms, is merely exemplary and illustrative and should not be deemed to be exclusive or comprehensive.

The methods, storage media, smart pet bowls, and systems disclosed herein are not limited to particular methodology, protocols, reagents, etc., described herein because, as the skilled artisan will appreciate, they may vary. Further, the terminology used herein is for the purpose of describing particular embodiments only, and is not intended to and does not limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, certain compositions, methods, articles of manufacture, or other means or materials are described herein.

As used herein, a plurality of elements, compositional components, and/or materials may be presented in a common list for convenience. However, these lists should be construed as though individual members of the list are individually identified as separate and unique members. Thus, no individual member of such list should be construed as a de facto equivalent of any other member of the same list solely based on presentation in a common group without indications to the contrary.

EXAMPLES

Features of the present disclosure can be further illustrated by the following examples, although it will be understood that these examples are included merely for purposes of illustration and are not intended to limit the scope of the invention unless otherwise specifically indicated.

Example 1—General Animal Feeding Behavior Modeling Protocols

The following examples are based on multiple studies carried out using primarily dogs to correlate load sensor data with specific feeding behaviors by collecting training data and then using that training data in additional studies to establish acceptable models based on training data. The training data and the testing data were correlated for accuracy in these studies using videography as its truth data for comparison purposes. Some additional studies using cats were also carried out, validating that the dog feeding behavior modeling can be carried out in a similar manner for cats. The processing of the data in some examples included identifying a meal session including meal segment(s) where a pet is interacting with the bowl (removing human interaction), splitting that meal session or meal segment into time increments, building features on top of the time increments, and using features as input to machine learning models with video truth data for that time increment as output. For classification models (class level output), recall, precision, and/or f1-scores were typically used to select the best model. For continuous outcome models, MAE, MAPE, RMSE, $R^2$ are used to establish the best model.

Example 2—Identifying Human Interactions

Figure 12:
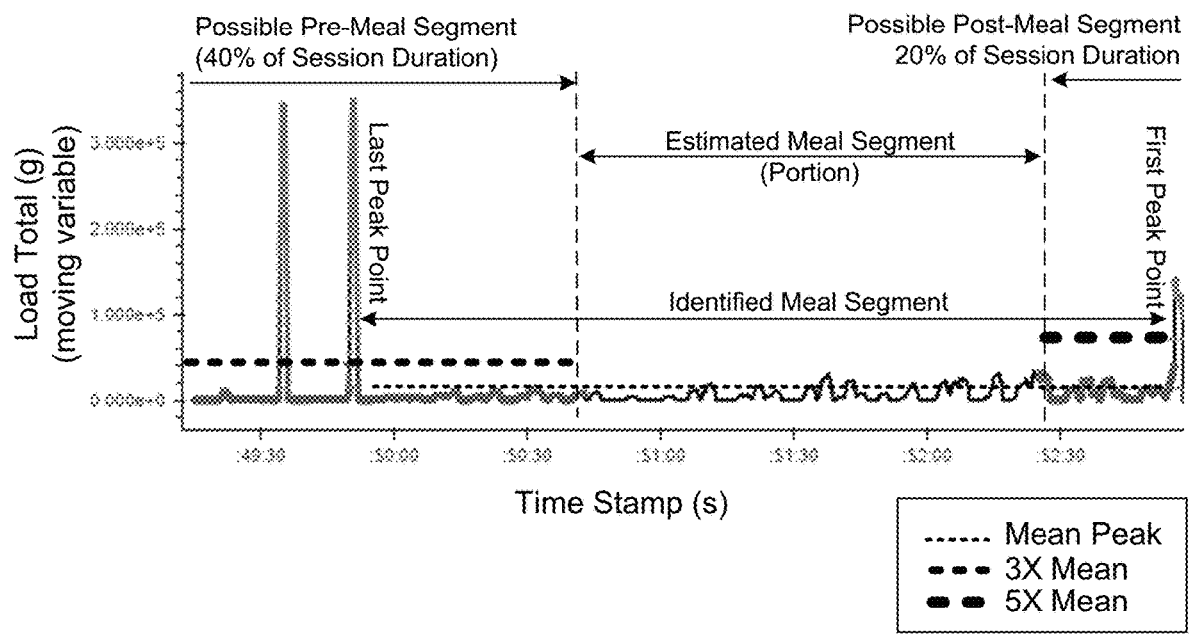
FIG. 12 is a graph illustrating examples of estimating, identifying, and filtering out pre- and post-meal segments in accordance with the present disclosure.

FIG. 12 illustrates how such data can be identified and trimmed from the animal feeding data collected from a smart pet bowl equipped with one or more load sensor(s) in accordance with the present disclosure. Possible pre- and post-meal human interactions may be established initially based on a percentage of the full duration of the data set collected. To illustrate, 40% of the duration is used at the front end of the meal session and 20% of the duration is used at the back end of the meal session is used in this example. To more carefully identify the start and end of the actual meal session and trim out the human interactions, a moving variance of the collected load values with a fixed time value can be used, e.g. 1 second, 2 seconds, 4 seconds, etc. In other words, possible pre-meal segments and possible post-meal segments can be incrementally checked within fixed time frames, and peaks can be identified that are several times greater than the mean peaks occurring during the meal segments not identified as pre- or post-meal segments. If the peak in one or more of the pre- or post-meal segments is at least 3 times (or at least 5 times, etc.) greater in amplitude relative to a standard peak occurring during the estimated meal segment portion (or the similarly sized standard peaks found in the possible pre- or post-meal segments), that signal may indicate a human interaction. The human interaction that is closest in proximity to the estimated meal segment portion can be used as a point to trim from the usable data set, leaving an identified meal segment that is devoid of human interaction. This same or similar process can be used to remove other types of data that are not useful in gathering feeding behavior data.

Example 3—Pre-Processing Cleanup of Data

In addition to removal of human interactions that can be identified and removed from the data set, load sensor data can be pre-processed and cleaned up using modeling logic. For example, video truth data was compared to training data and also testing data for populations of dogs to identify misaligned video data versus load sensor data to be cleanup up from the data set. In further detail, collected load sensor data was cleaned to further clarify the relevant load sensor signal related to various feeding behaviors, e.g., eating, food dropping, licking, and nosing food. These feeding behaviors were used to collect load sensor micro-events (or individual loads applied during micro-events or durations) during the behavior based on a threshold load that is relevant to the population of animals being evaluated. For dogs in this study, the threshold was about 1 gram or greater than 1 gram. In this scenario, the logic was programmed to ignore any actions if the micro-event was 1 gram or less and other criteria was met indicative of poor correlation of the load sensor data with the truth data collected by videography.

In addition, pre-processing of the load sensor data may include identifying a full meal session start and stop points (or small meal segment start and stop points within the full meal session). Identifying the start point and/or end point of meal segments included identified human interactions from the session and predicting feeding behaviors (or actions), mapping animal interaction at a time stamp level such that the first and/or last time stamp predicted as eating (or drinking) could be considered the start point and/or the stop point of the meal, respectively. Notably, these examples show only a small snapshot of the full meal for illustrative purposes, as the meal would typically be longer in duration.

To determine a start point in this example, food was offered in a smart pet bowl and an average baseline load value for the filled bowl was established before the start of eating to establish a food offered weight or mass. Once an animal begins eating, variable load signals were collected and the start point established by that load sensor data. In some instances, the animal being evaluated began to eat immediately upon the pet food being offered, which did not give enough time to establish an average baseline load value. In this instance, the food offered weight or mass was calculated using other data collected during the full session, which included collecting data during feeding breaks, consumption rate, time increments during shorter meal segments, etc.

To determine a stop point in this example, one of two scenarios occurred, including the food being completely consumed or the animal stopped eating prior to the food being completely consumed. The food being fully consumed was determined when the load value of the bowl matched the known load value of the bowl prior to filling the bowl with food, e.g., 0 grams food remaining. On the other hand, a calculation was used when there was food remaining in the smart pet bowl, which was based on the smallest possible value in the last fixed time period of the session, e.g., the last 1 second, the last 3 seconds, the last 5 seconds, etc.

Example 4—Meal Session Interactions and Time Increments

Figure 13:
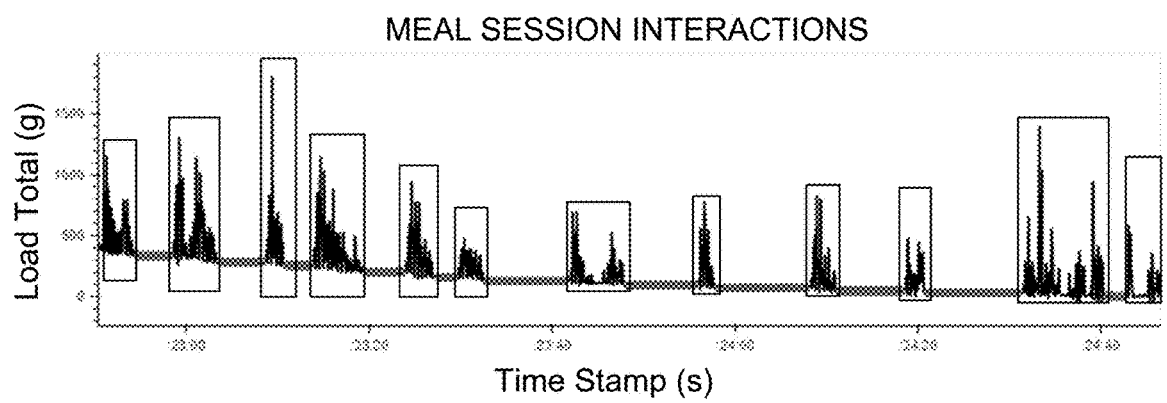
FIGS. 13-15 are graphs illustrating a meal session with pet interactions and/or time increments identified in accordance with the present disclosure.
Figure 14:
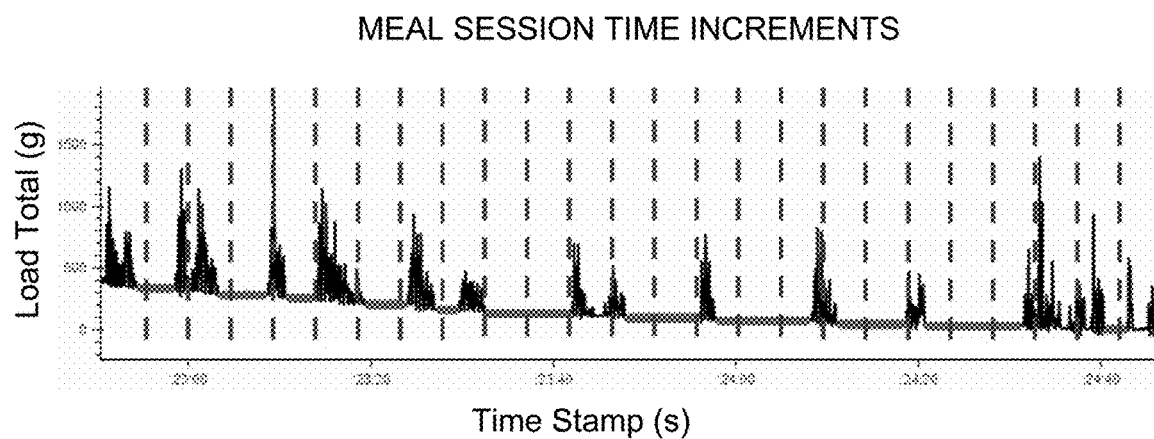
Figure 15:
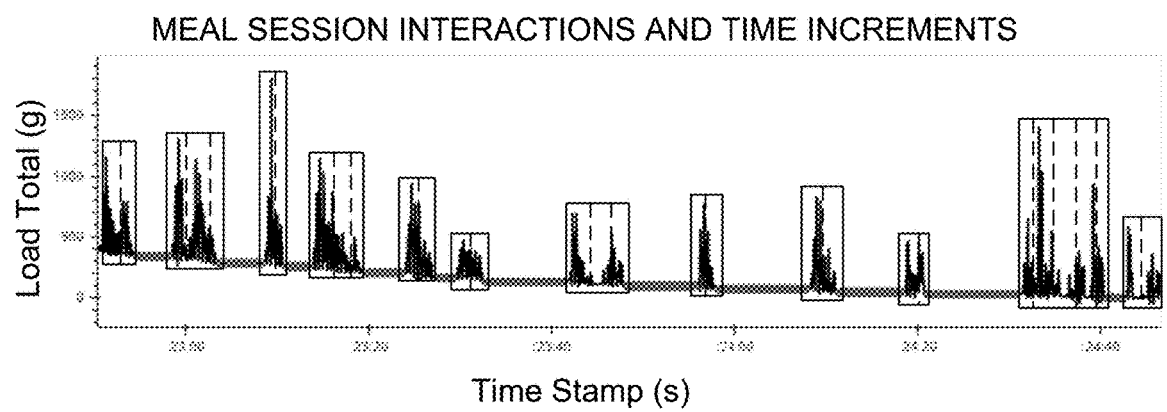

FIGS. 13-15 each show a portion of a single meal session. FIG. 13 illustrates various discrete groupings of interactions (each grouping including multiple micro-events, e.g. individual laps, individual licks, etc.) using boxes to show each of the interactions the animal has with the smart pet bowl or pet food contained therein based on load data. FIG. 14 illustrates, by dotted lines, time increments which can be used to bundle data. In this example, the time increments were bundled in 0.075 second increments. FIG. 15 combines the discrete groupings of interactions and breaks them up to include the relevant time increments occurring during the discrete interactions. Splitting the data based on the above examples and building features on the resulting time series improves model performance. For different models, different session/interaction/time window combinations were chosen to optimize model performance.

Example 5—Eating Repetition Modeling

A dog study was conducted which included evaluating multiple features, 333 training sessions, and 67 animal evaluation sessions. Some of the features of this study included removing contents activity duration, number of peaks in a normalized load, interaction duration, number of crests, number of troughs per timestamp in a normalized load, number of crests in gradient, autocorrelation of lag 2 for RMS of gradient, medium gradient value, number of peaks in gradient, and autocorrelation of lag 3 for gradient, to name a few.

In processing data from the load sensors of the smart pet bowls of the present disclosure, various machine learning models for continuous variables can be used. Continuous variables were used were based on various machine learning logic systems with Mean Absolute Error (MAE), Mean Absolute Percentage Error (MAPE), Root Mean Squared Error (RMSE), Coefficient of Determination ($R^2$) to identify the best model. The data is provided in Table 2, as follows:

TABLE 2

Eating Repetition Model

|  | Training Session | Evaluation Session |
|---|---|---|
| MAE | 1.5 | 1.8 |
| MAPE | 27.5% | 26.7% |
| RMSE | 2.7 | 3.2 |
| $R^2$ | 92.7% | 90.6% |

As can be seen in Table 2, there was a strong linear relationship between the predicted number of reps and the actual number of reps for both the training and the evaluation session as indicated by the $R^2$ values above 90%. The mean absolute error in the prediction of number of reps for eating was less than +/−2 reps for both the training and the evaluation set.

Example 6—Lapping and Licking Load Signatures

Figure 16:
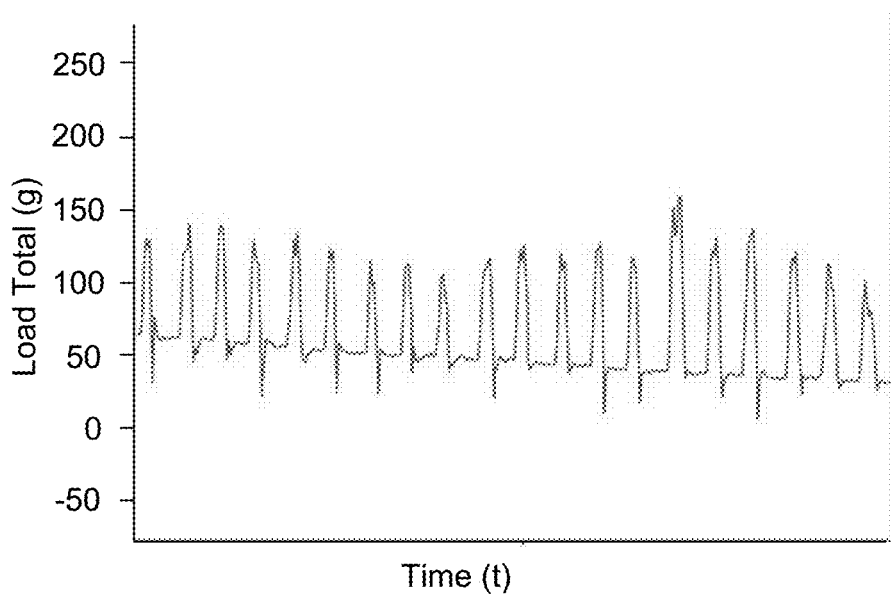
FIG. 16 is a graph illustrating an example load data signal signature obtained from a pet while lapping water from a smart pet bowl in accordance with the present disclosure.
Figure 17:
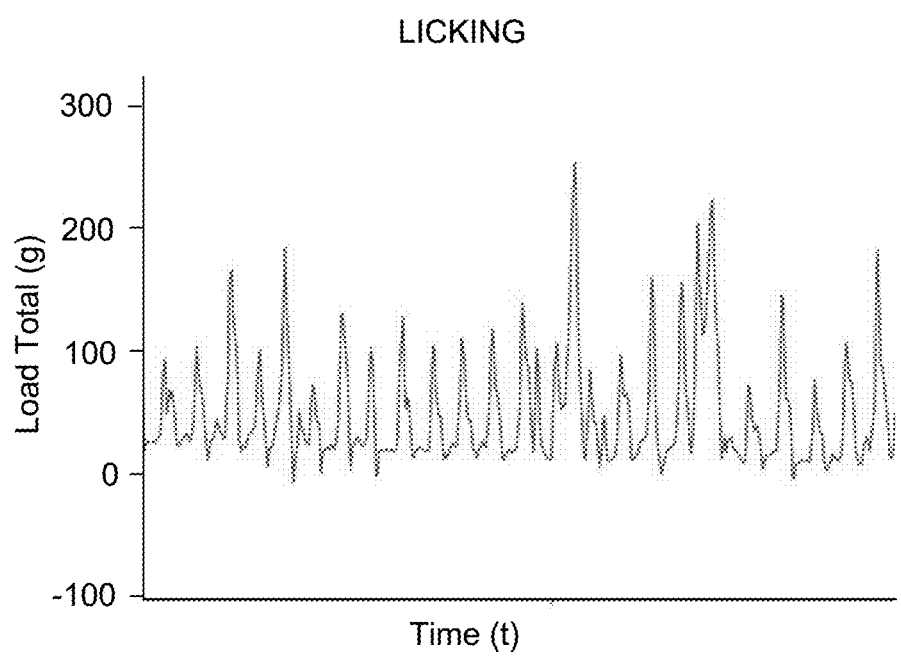
FIG. 17 is a graph illustrating an example load data signal signature obtained from a dog while licking water from a smart pet bowl in accordance with the present disclosure.

Referring now to FIGS. 16 and 17, two sample data sets are shown including a load signature that occurred while a dog was lapping water from a smart pet bowl (FIG. 16) and while a dog was licking water in a smart pet bowl (FIG. 17). This data was illustrates a short period of time, i.e. a several seconds, which can vary from animal to animal. However, these load signatures depicting load peaks and valleys are identifiable as distinct from one another, for example, due to the more rhythmic pattern of lapping compared to the more chaotic pattern of licking. These visual indicators assisted with the identification of appropriate features to differentiate lapping from licking. For example, some of the features identified included height of peaks, distance between peaks, standard deviation of distance between peaks, number of peaks, features on crests and troughs, etc. To summarize these two load signature examples, lapping appeared to be more rhythmic, where the animal put the tongue in the bowl, make a water column, bit the water column, and then the water fell back in the bowl. Licking, on the other hand, appeared to be more chaotic, where the animal used the tongue and moves it about the bottom of the bowl to collect water that was left on the surface. The two load signatures depicted in this example were visually consistent with what is understood about lapping and licking, and as can be seen, were shown to be different enough to be distinguished by their load signature without the need for other inputs.

Example 7—Processing Meal Segment Data

In this evaluation, meal segment identification during a single session was evaluated for meal duration (seconds) and meal consumption (grams). Values were determined for pet food offered, pet food remaining (after meal), meal start point, and meal end point, as shown in Table 3A and then values were determined using various regression error metrics, as shown in Table 3B. Machine learning models for meal segment identification were built that included i) continuous variable duration and ii) continuous variable consumption. Mean Absolute Error (MAE), Mean Absolute Percentage Error (MAPE), Root Mean Squared Error (RMSE), and/or Coefficient of Determination ($R^2$) were studied to identify the best model. For example, MAE were found to be useful in understanding the average deviation of the prediction from actual values and $R^2$ was found to be useful to assess the linear relationship between the actual and predicted values.

TABLE 3A

Meal Duration and Consumption Distributions

|  | Mean | Std_Dev | Median |
|---|---|---|---|
| Overall Meal Duration Distribution (secs) | 221.5 | 176.8 | 164.0 |
| Overall Meal Consumption Distribution (grams) | 193.0 | 134.1 | 148.9 |

TABLE 3B

|  | Meal Duration (secs) | Meal Consumption (grams) |
|---|---|---|
| MAE | 8.6 | 5.9 |
| MAPE | 6.30% | 3.70% |
| RMSE | 22.9 | 16.7 |
| $R^2$ | 98.30% | 98.40% |

With MAE and RMSE in [0, ∞), smaller is better; and for R2, [0, ∞), larger is better.

As can be seen by the data collected, the results show that the estimated duration was on average approximately +/−9 seconds of true duration where the true duration was on average around 222 seconds (+/−4%) and that the estimated meal consumption was on average +/−6 grams of the true amount consumed where the true amount consumed was on average around 193 grams (+/−3%). The relationship between the predicted values and the observed values for duration and consumption having R^2 values of above 98% show the duration and consumption models are highly accurate.

Example 8—Meal Activity Classification within Meal Session (Eating and/or Drinking)

Training protocols can be used to improve the predictive logic related to various eating and/or drinking behaviors. In this study, six feeding behavior parameters were evaluated, including eating, pausing in eating, bowl touching, licking, nosing food, and food dropping, which were compared to predicted values of individual micro-events. As mentioned in Example 1, truth data in the form of videography was used for two different studies, one which related to training of the smart pet bowl, e.g., training data, and one which related to testing the smart pet bowl, e.g., testing data. For example, a variety of machine learning classifies were used. The training data was used to establish feeding behaviors and the testing data was used to identify an acceptable classification model, which in this instance was deemed to be the best classification model. A confusion matrix alongside recall, precision, and F1-scores were used to compare actual data to predicted data.

Table 4 below shows some example results that indicated the high predictive power of the modeling that may be carried out for classes with high support. The model performs well at predicting eating, pausing, bowl touching, and licking. Nosing food and food dropping do not perform as well using these parameters selected for this study, but may improve with different load sensitivities and/or additional training data, for example.

TABLE 4

Model Performance

| Activity | *Precision | **Recall | ***F1-Score |
| --- | --- | --- | --- |
| Eating | 92.6% | 97.9% | 95.2% |
| Pause | 99.7% | 99.7% | 99.7% |
| Bowl Touching | 83.4% | 78.8% | 81.0% |
| Licking | 90.3% | 77.1% | 83.2% |
| Nosing Food | 57.7% | 26.5% | 36.4% |
| Food Drop | 77.4% | 26.6% | 39.6% |
| Overall | 92.5% | 93.1% | 92.4% |

*Recall refers to the proportion of true positive predictions out of all actual positives.
**Precision refers to the proportion of true positive predictions out of all positive predictions (the actual values obtained via video truth labels).
***F1 score is metric that combines precision and recall giving an overall metric of model performance, where F1-scores have a maximum value of 100% (indicating a perfect model). Models for use in this example were selected based on the highest F1-score.

As can be seen in Table 4, the model performed very well at being able to identify eating and pause with F1-scores above 90%. The model also performed well at identifying licking and bowl touching with F1-scores above 80%. The model did not perform well for nosing and food drop, low support classes, but may continue to improve with additional support as we did see that adding data improved results; however, those actions are just rarer in dog eating sessions Example 9—Modeling Performance During Drinking Sessions In further detail regarding characterizing lapping compared to licking during a drinking session, various modeling or logic can be used to collect and process data from a load sensor. For example, using machine learning logic can be collected related to various drinking behaviors, e.g., lapping, licking, others, pausing, etc. (evaluating four classifications or groupings of drinking behavior). In this example, data was collected based on 190 test sessions with time increments (or time windows) used for collecting data set at 0.4 seconds per window. Results of this study are provided in Table 5, as follows:

TABLE 5

Model Performance

| Activity | Precision | Recall | F1-Score |
| --- | --- | --- | --- |
| Lapping | 95.5% | 95.7% | 95.6% |
| Licking | 83.4% | 83.5% | 83.5% |
| Others | 92.6% | 91.8% | 92.2% |
| Pause | 99.9% | 100.0% | 99.9% |
| Overall Count | 95.2% | 95.2% | 95.2% |

As can be seen in Table 5, the model performed very well at being able to identify lapping, licking, or other behaviors with F1-scores above 90%. The model also performed well at identifying licking with an F1-score above 80%.

Example 10—Combined Modeling Using Both Lapping and Licking Data

A combined model that takes into account repetitions of both lapping and licking is also useful in modeling the feeding behavior of a pet for purposes of monitoring and/or discovering health insights. Data collected from a combined repetition model for lapping and licking of dogs along with an actual repetition (Y) distribution is provided in Table 6, with model performance data is provided in Table 7.

TABLE 6

Combined Lapping and Licking

| | Mean | Std_Dev | Max |
| --- | --- | --- | --- |
| Observed Repetitions per Interaction | 26.1 | 33.0 | 164 |

TABLE 7

Modeling for Combined Lapping and Licking

| Aggregation Level | | MAE | RMSE | $R^2$ |
| --- | --- | --- | --- | --- |
| Interaction | Train | 1.8 | 3.3 | 99.0% |
| Level | Test | 5.0 | 8.7 | 93.0% |

MAE = Mean Absolute Error
RMSE = Root Mean Squared Error
$R^2$ = Coefficient of Determination As can be seen in Tables 6 and 7, the model performed well with a strong linear relationship between the predicted and observed repetitions, as indicated by the values above 90% for both the train and the test set. The mean absolute error for the test set was +/−5 reps above or below the mean 26.1 (+/−19%). For this combined licking and lapping model, the features that provided the best performance were i) the interaction duration, number of crests on the load, number of peaks to interaction duration, total number of peaks on a normalized load, and the number of negative peaks to interaction duration.

Example 11—Repetition Modeling Using Normalization Logic

Figure 18:
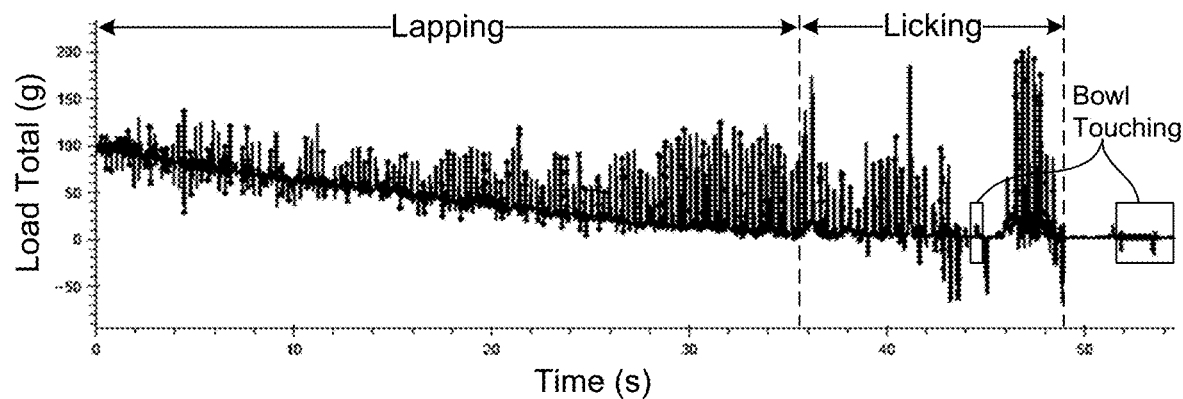
FIG. 18 is a graph illustrating example data collected from a dog illustrating lapping segments, licking segments, and bowl touching in accordance with the present disclosure.
Figure 19:
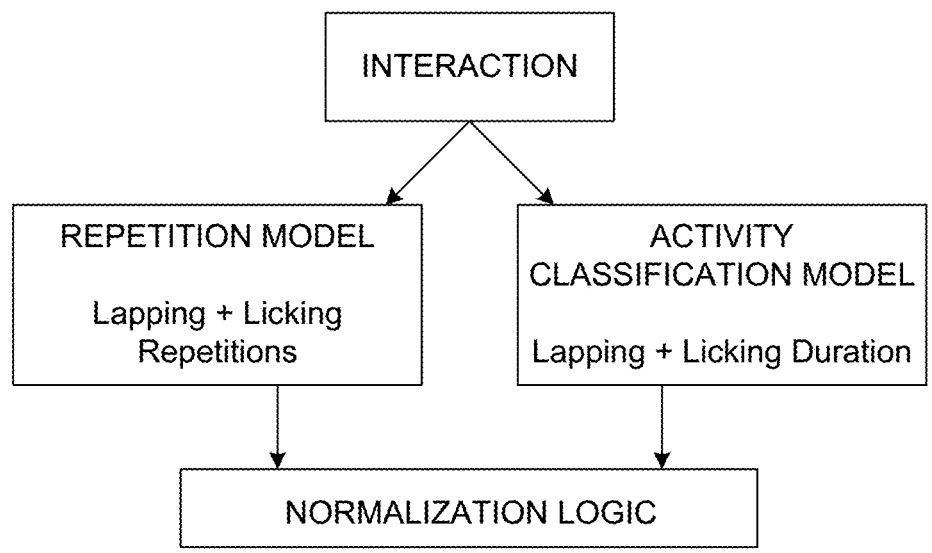
FIG. 19 is a flowchart illustrating example systems and methods of processing data collected during an animal interaction with a smart pet bowl using a repetition model with normalization logic in accordance with the present disclosure.

The use of a repetition model using normalization logic provides a way of merging data, such as merging outputs from an activity classification model and a combined repetition model to determine lapping and licking repetitions. FIG. 18 illustrates example load data collected during a drinking session with both lapping and licking (as well as two instances of bowl touching). FIG. 19 illustrates how normalization logic may be applied to the data collected as shown in FIG. 18 or other similar examples.

Example 12—Single Feeding Behavior Model Performance

To illustrate model performance using a separate repetition model for a single feeding behavior (rather than two or more combined feeding behaviors) of a dog, i.e., lapping, data was collected and processed as shown in Tables 8-10 For this data, 190 test sessions were used with a machine learning model set at default parameters. In this example, Table 8 provides data results when using a separate lapping model with repetition (Y) distribution, Table 9 provides lapping model performance results, and Table 10 provides the normalized lapping performance results.

TABLE 8

Actual Repetition Distribution

|  | Mean | Std_Dev | Max |
|---|---|---|---|
| Interaction Level | 20.18 | 26.66 | 157 |

TABLE 9

Model Performance Data

|  | MAE | RMSE | $R^2$ |
|---|---|---|---|
| Interaction Level | 5.3 | 9.5 | 87.3% |

MAE = Mean Absolute Error
RMSE = Root Mean Squared Error
$R^2$ = Coefficient of Determination

TABLE 10

Normalized Output Performance

|  | MAE | RMSE | $R^2$ |
|---|---|---|---|
| Interaction Level | 3.8 | 7.3 | 92.5% |

MAE = Mean Absolute Error
RMSE = Root Mean Squared Error
$R^2$ = Coefficient of Determination As can be seen in this data, the normalized lapping output model of Table 10 performed better than the lapping model of Table 9.

Example 13—Health Insights for Pets

With respect to health insights, various health issues can be correlated with the feeding behavior data collected, is based on animal interactions with the smart pet bowls of the present disclosure. Health insights obtainable from the smart pet bowls and related systems and methods may include identification of conditions related to general animal health, such as dental health, diabetes, renal health, digestion, and the like. For example, a change in feeding behaviors, e.g., increase or decreasing in eating or drinking frequency, eating or drinking duration, eating or drinking rate, biting or licking repetition, pauses, volume consumed, etc., can provide insights into animal health.

Example 14—Load Data Collection and Processing for Cats

Much of the data shown and described in the preceding examples related to dog studies. However, cat feeding behaviors can likewise be collected using one or more load sensors associated with a smart pet bowl in accordance with the present disclosure. Load data can be collected and processed in a similar manner as describe above with respect to the dog studies. Notably, however, cats tend to eat and drink more quickly than dogs and additionally, cats tend to eat and drink more delicately than dogs on average. Thus, with a smart pet bowl set up for use by a cat, for example, it may be that a load sensor(s) with some enhanced sensitivity may be helpful compared to load sensor sensitivity used for dogs. That being said, a load sensor with more (too much) sensitivity than is necessary may not be of particular concern, provided the load sensor(s) are sensitive enough and respond quickly enough to capture micro-behaviors of interest that are to be captured using load sensor data.

As an example of data collected from a cat study, a smart pet bowl was used with four (4) individual load sensors spaced equidistant around a bottom surface of the bowl. Notably, fewer or more load sensors may be used, e.g., from 1 to 10. In this example, four separate loads from the four load sensors was collected and then added together to approximate the loads that could be obtained by a smart pet bowl with a single load sensor. Recorded data for total counts, mean loads recorded, standard deviations, minimum loads recorded, percentage of the counts below specific load values, and maximum loads were recorded and evaluated. In this study, the cumulative load sensor total registered less than about 75 grams for 99.5% of the counts. From this cat data, the use of a load sensor(s) with a suitable load sensitivity were selected.

In the specification, there have been disclosed certain embodiments of the invention. Although specific terms are employed, they are used in a generic and descriptive sense only and not for purposes of limitation. The scope of the invention is set forth in the claims. Many modifications and variations of the invention are possible in light of the above teachings. It is therefore to be understood that within the scope of the appended claims, the invention may be practiced otherwise than as specifically described.

What is claimed is:

1. A method of monitoring feeding behavior of a pet, under the control of at least one processor, comprising:
    obtaining load data from a load sensor of a pet bowl while the pet is interacting with contents of the pet bowl, wherein the load sensor has a sensitivity of +/−50 grams or less and the load data is obtained at a sample rate from 10 samples to 150 samples per second;
    sequentially grouping the load data in 0.01 second to 5 second time increments, wherein individual time increments include multiple samples; and
    identifying a feeding behavior occurring within one or more of the time increments based on the load data resulting from the pet interacting with the pet bowl or the contents of the pet bowl.

2. The method of claim 1, further comprising excluding load data in identifying the feeding behavior if determined to be a result of human interaction, a false trigger, or an accidental interaction with the pet bowl or the contents of the pet bowl.

3. The method of claim 1, wherein the feeding behavior is a count-based feeding behavior selected from lapping, licking, or biting.

4. The method of claim 3, further comprising characterizing the count-based feeding behavior by counting individual micro-events of the feeding behavior within a single time increment or a time period spanning multiple time increments, wherein the individual micro-events include individual laps, individual licks, or individual bites.

5. The method of claim 4, wherein characterizing the count-based feeding behavior includes characterizing periods of time spanning one or multiple time increments where the count-based behavior is not occurring.

6. The method of claim 1, wherein the feeding behavior is a duration-based behavior selected from the pet touching the bowl, moving the bowl, nosing the food, pausing, eating, lapping, licking, or biting.

7. The method of claim 6, further comprising characterizing the duration-based feeding behavior by sequentially mapping the time increments in which the duration-based behavior occurs or is not occurring.

8. The method of claim 1, further comprising notifying a custodian of the pet of the feeding behavior or a change in the pet feeding behavior.

9. The method of claim 8, wherein notifying the custodian of the pet includes warning the custodian that the changes in the pet feeding behavior may be correlated to a potential health or behavior issue.

10. The method of claim 1, further comprising obtaining secondary data from a secondary sensor associated with the pet bowl, wherein the secondary sensor includes a proximity sensor, a camera, a microphone, an accelerometer, a gyroscope, an inertial measurement unit sensor, or a combination thereof.

11. The method of claim 1, wherein the pet bowl is a dog water bowl, and wherein the load sensor has a sensitivity of +/−4 grams or less, the sample rate is from 15 samples to 75 samples per second, and the time increments are at least about 0.4 second.

12. The method of claim 1, wherein the pet bowl is a dog food bowl, and wherein the load sensor has a sensitivity of +/−4 grams or less, the sample rate is from 15 samples to 75 samples per second, and the time increments are at least about 0.3 second.

13. The method of claim 1, wherein the pet bowl is a cat water bowl, and wherein the load sensor has a sensitivity of +/−2 grams or less, the sample rate is from 15 samples to 75 samples per second, and the time increments are at least about 0.4 second.

14. The method of claim 1, wherein the pet bowl is a cat food bowl, and wherein the load sensor has a sensitivity of +/−2 grams or less, the sample rate is from 15 samples to 75 samples per second, and the time increments are at least about 0.3 second.

15. The method of claim 1, further comprising generating a feeding behavior model for the pet, including identifying the feeding behavior of the pet based on frequency of feeding, pet feeding signature behaviors, or a combination thereof.

16. The method of claim 1, further comprising identifying an identity of a pet in a multi-pet household.

17. A non-transitory machine readable storage medium having instructions embodied thereon, the instructions when executed cause a processor to perform a method of monitoring feeding behavior of a pet, comprising:
   obtaining load data from a load sensor of a pet bowl while the pet is interacting with the contents of the pet bowl, wherein the load sensor has a sensitivity of +/−50 grams or less and the load data is obtained at a sample rate from 10 to 150 samples per second;
   sequentially grouping the load data in 0.01 second to 5 second time increments, wherein individual time increments include multiple samples; and
   identifying a feeding behavior occurring within one or more of the time increments based on the load data resulting from the pet interacting with the pet bowl or the contents of the pet bowl.

18. The non-transitory machine readable storage medium of claim 17, wherein monitoring feeding behavior of the pet includes monitoring a count-based feeding behavior selected from lapping, licking, or biting.

19. The non-transitory machine readable storage medium of claim 17, wherein monitoring feeding behavior of the pet includes monitoring a duration-based behavior selected from touching the bowl, moving the bowl, nosing the food, pausing, eating, lapping, licking, or a combination thereof.

20. The non-transitory machine readable storage medium of claim 17, wherein monitoring feeding behavior of the pet includes notifying a custodian of the pet of: the feeding behavior, a change in the feeding behavior, a potential health issue associated with the feeding behavior, or a combination thereof.

21. The non-transitory machine readable storage medium of claim 17, wherein the load sensor has a sensitivity of +/−4 grams or less, the sample rate is from 15 samples to 75 samples per second and the time increments are at least about 0.3 second.

22. The non-transitory machine readable storage medium of claim 17, wherein monitoring feeding behavior of the pet includes identifying the pet for monitoring when the pet is from a multi-pet household.

* * * * *